Inventors
Ferman N. Lee, Dec'd
Dolores R. Lee, Exrx.
William F. MacKenzie
Alfred C. D'Arcey
Alfred G. Cicchetti
By their Attorney

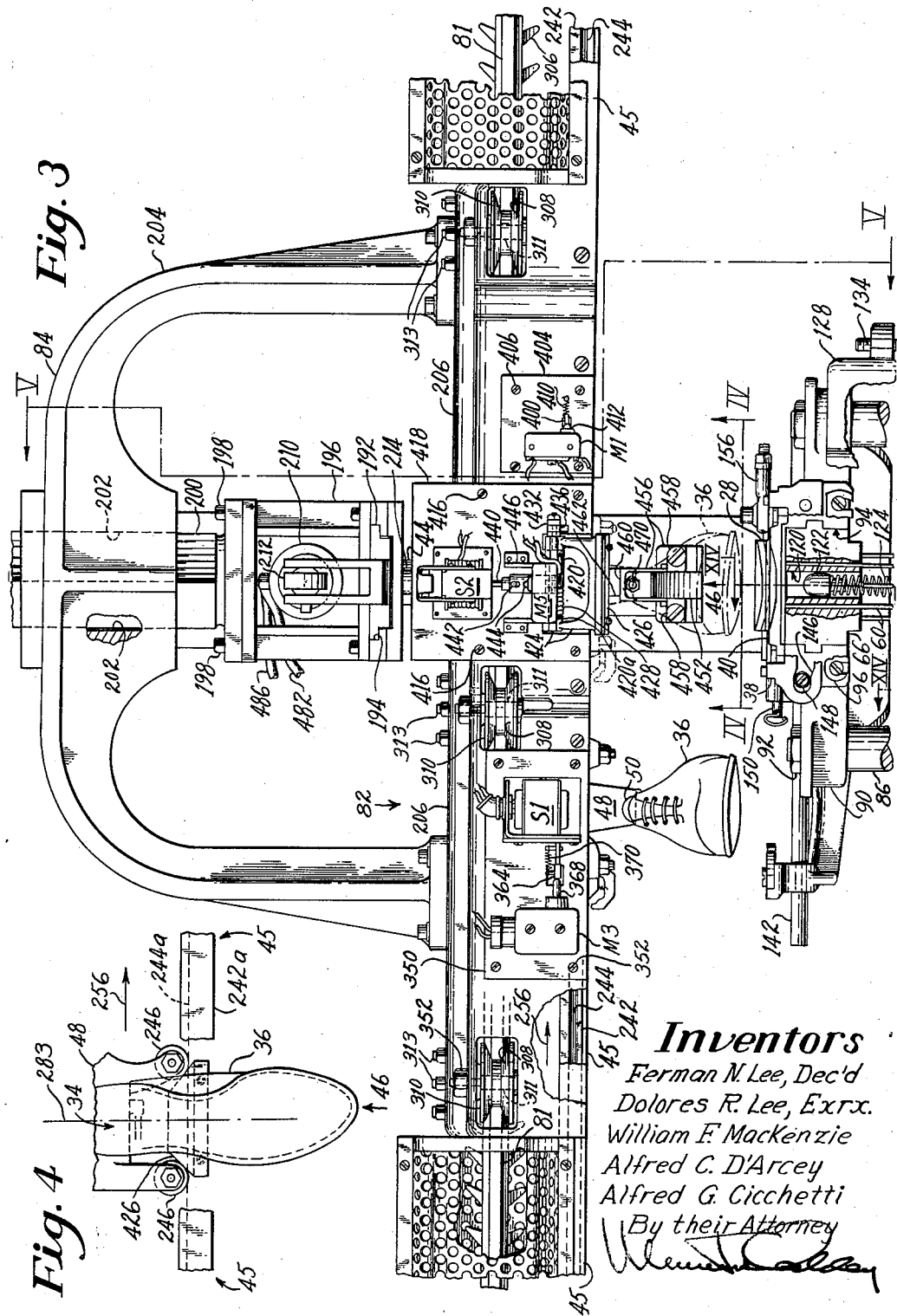

Sept. 22, 1959    F. N. LEE ET AL    2,904,788
HEEL ATTACHING MACHINES AND WORK CONVEYING
MEANS FOR USE THEREWITH
Filed Aug. 27, 1957    10 Sheets-Sheet 4
Fig. 5
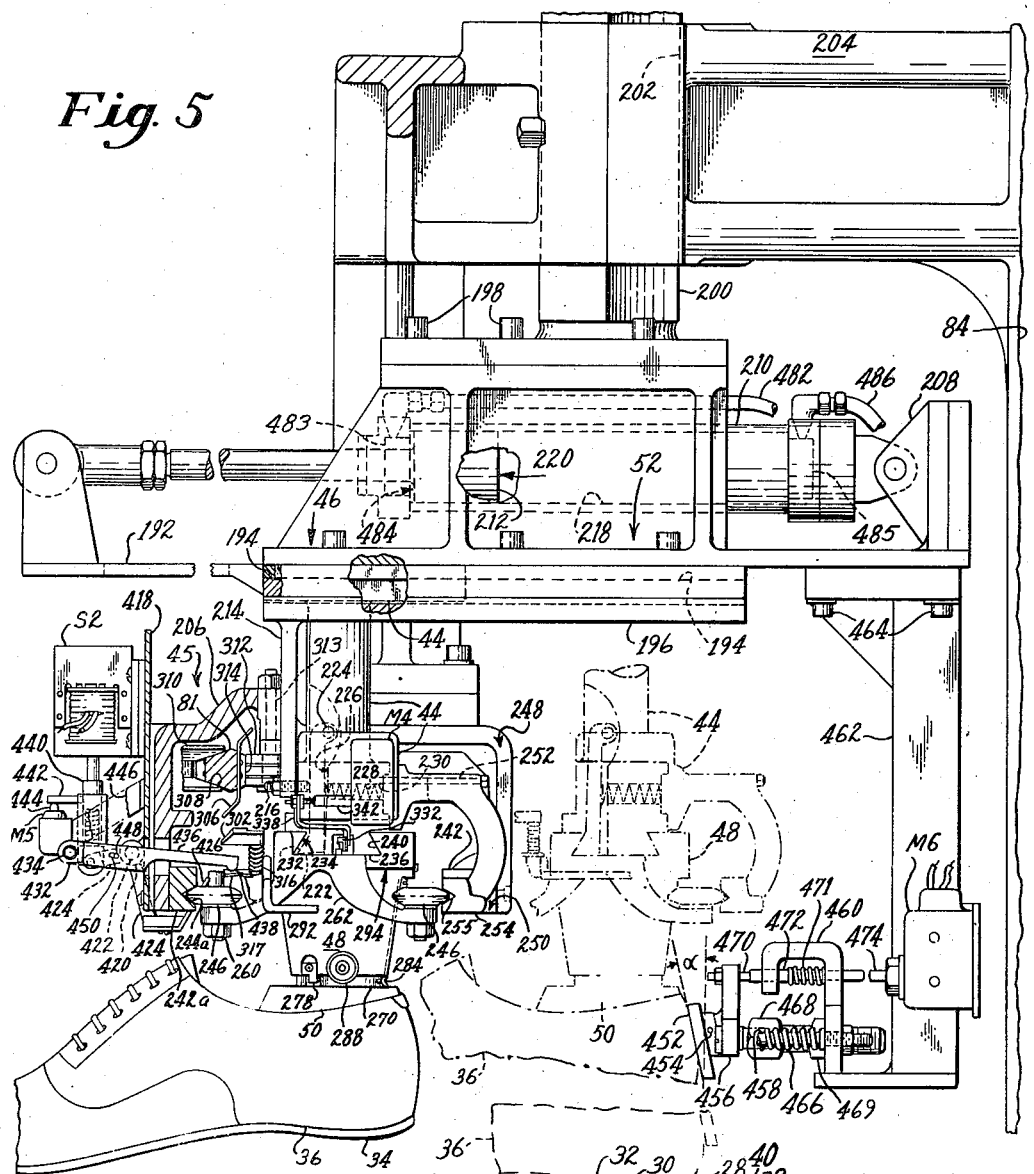
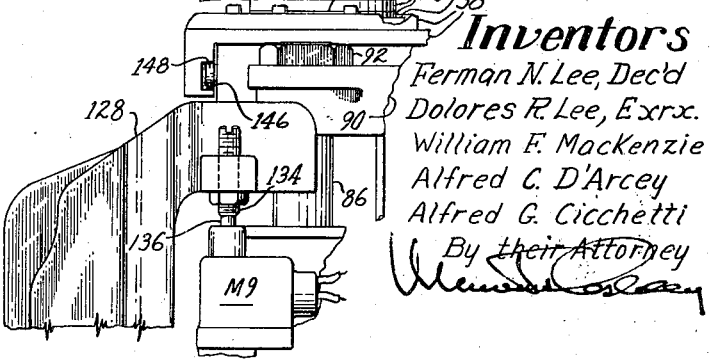
Inventors
Ferman N. Lee, Dec'd
Dolores R. Lee, Exrx.
William F. MacKenzie
Alfred C. D'Arcey
Alfred G. Cicchetti
By their Attorney

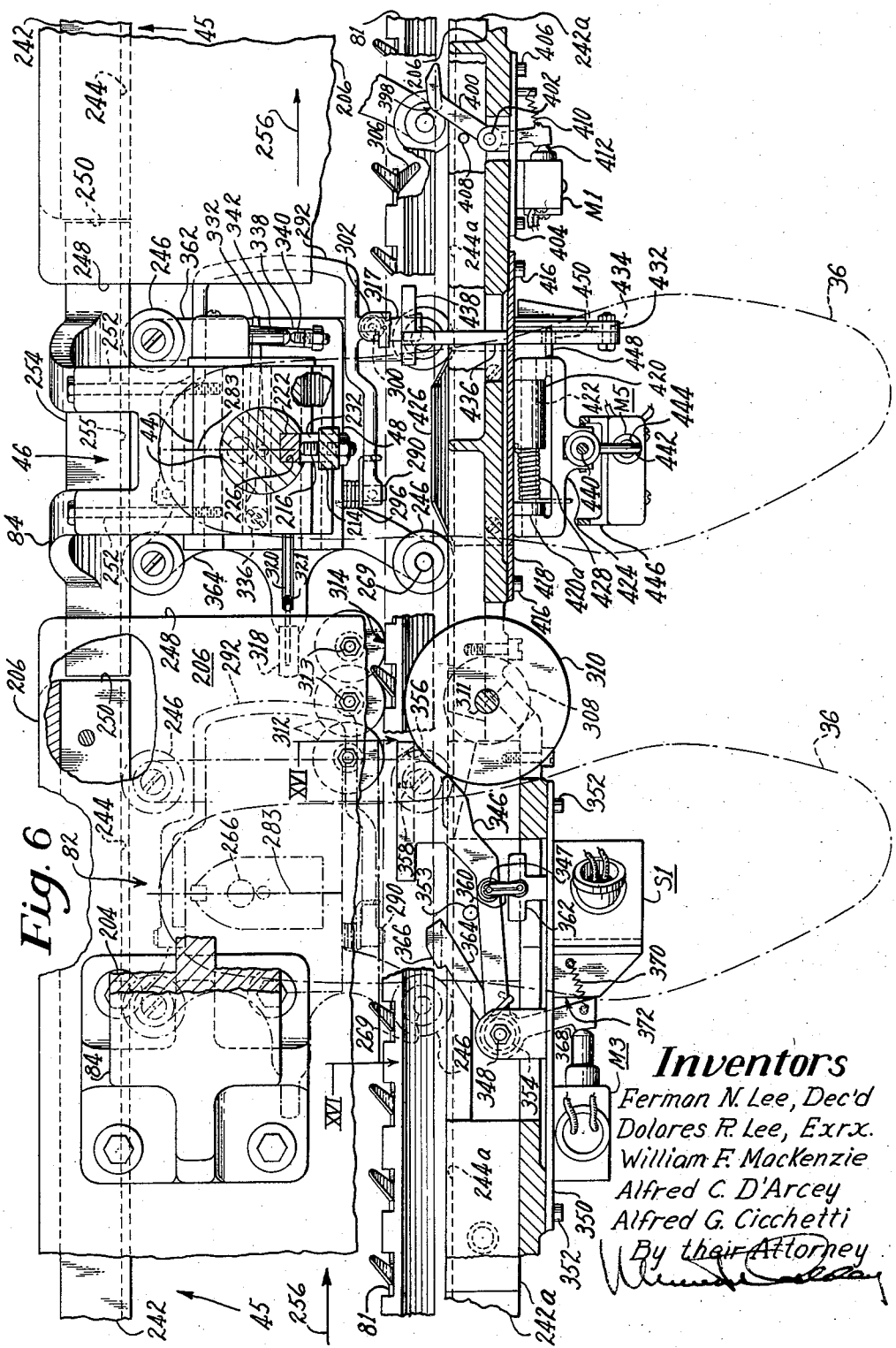

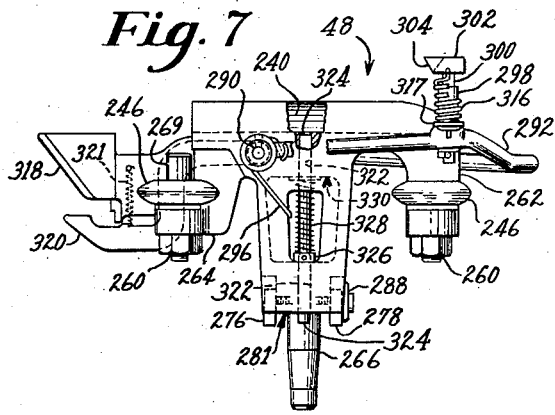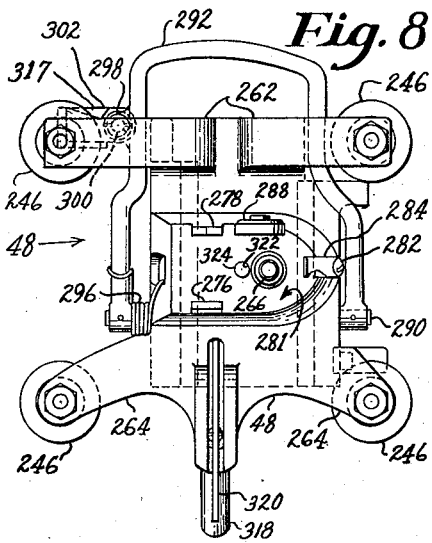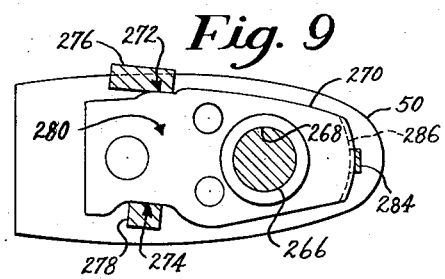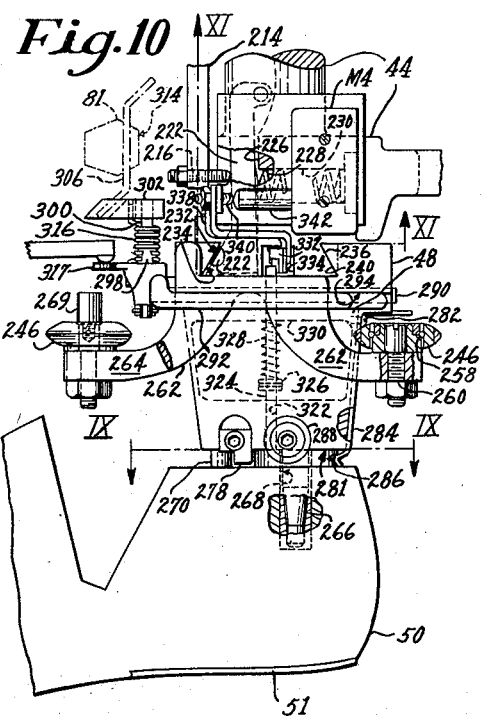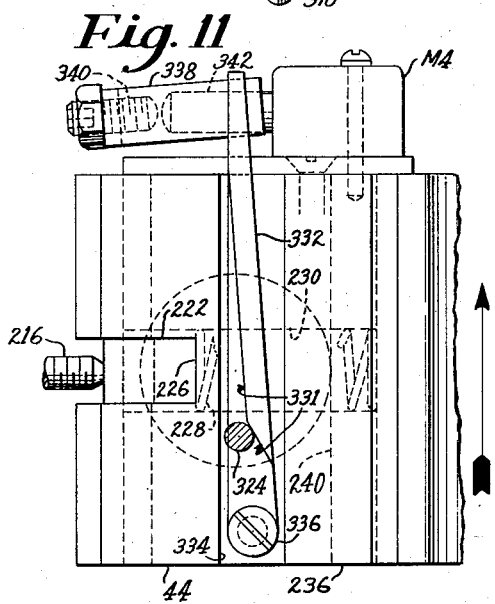
Inventors
Ferman N. Lee, Dec'd
Dolores R. Lee, Exrx.
William F. MacKenzie
Alfred C. D'Arcey
Alfred G. Cicchetti
By their Attorney

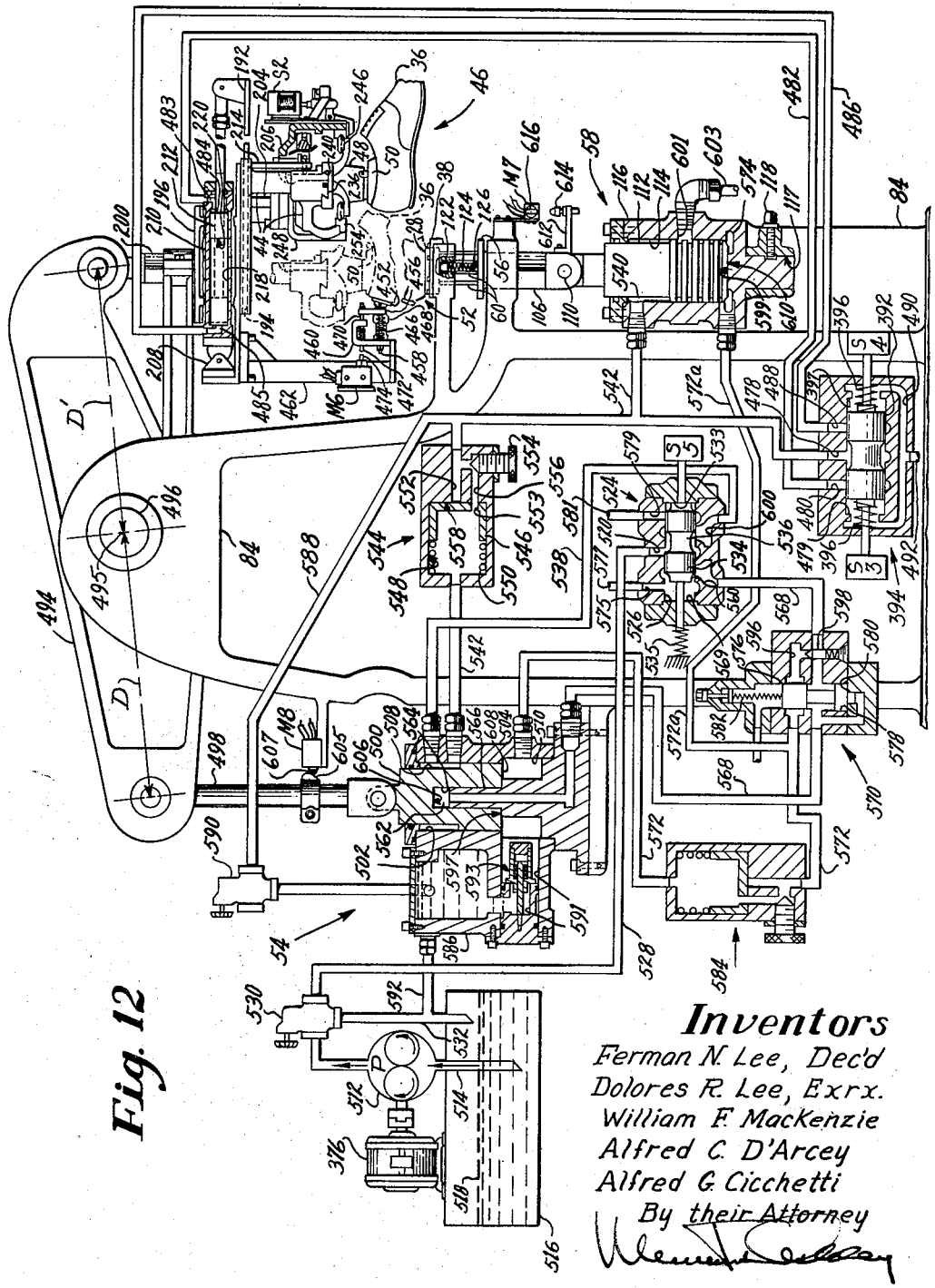

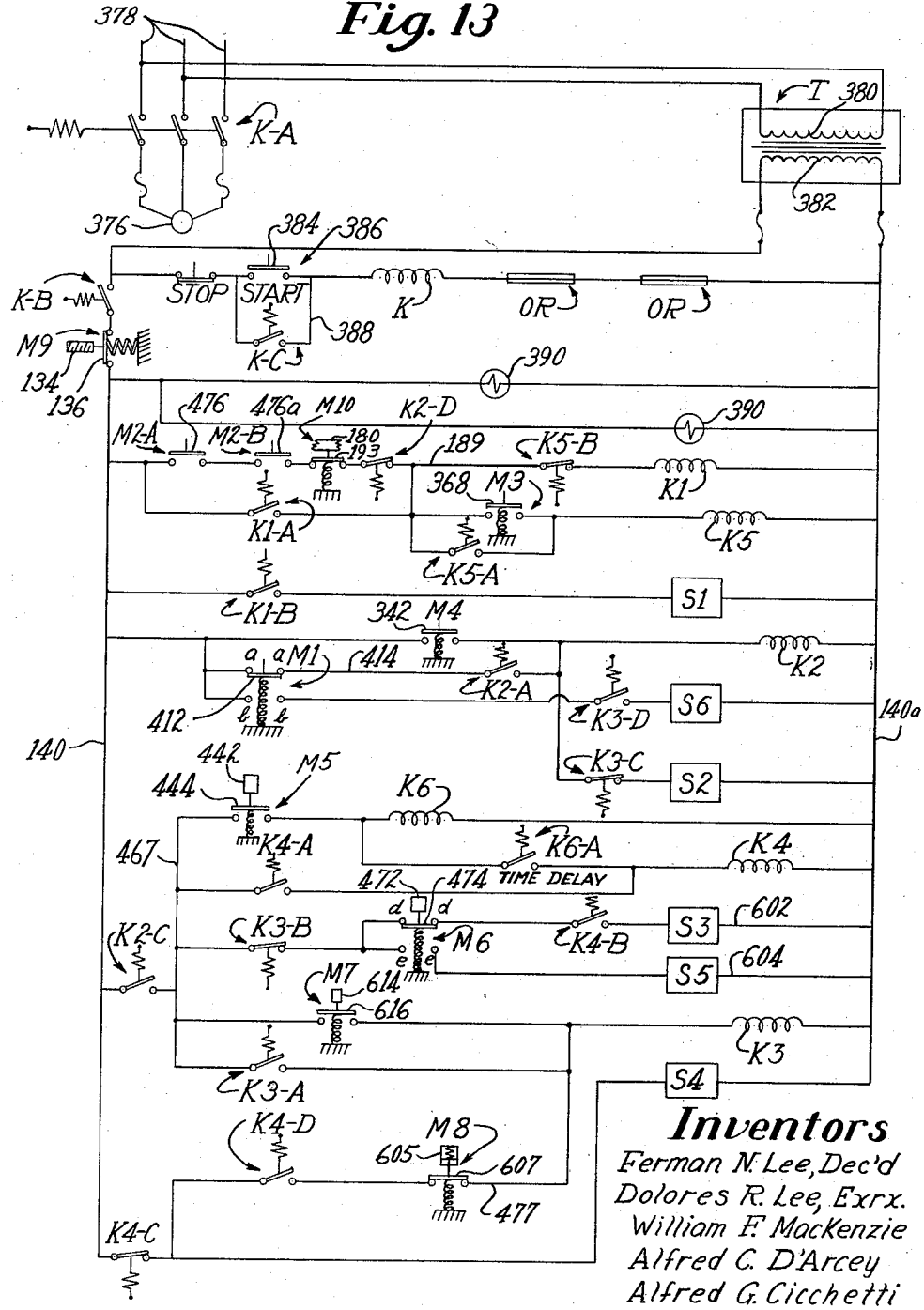

Sept. 22, 1959 F. N. LEE ET AL 2,904,788
HEEL ATTACHING MACHINES AND WORK CONVEYING
MEANS FOR USE THEREWITH
Filed Aug. 27, 1957 10 Sheets-Sheet 9

*Inventors*
Ferman N. Lee, Dec'd
Dolores R. Lee, Exrx.
William F. MacKenzie
Alfred C. D'Arcey
Alfred G. Cicchetti
By their Attorney

Inventors
Ferman N. Lee, Dec'd
Dolores R. Lee, Exrx.
William F. MacKenzie
Alfred C. D'Arcey
Alfred G. Cicchetti
By their Attorney United States Patent Office 2,904,788
Patented Sept. 22, 1959

2,904,788

HEEL ATTACHING MACHINES AND WORK CONVEYING MEANS FOR USE THEREWITH

Ferman N. Lee, deceased, late of Danvers, Mass., by Dolores R. Lee, executrix, Binghamton, N.Y., William F. MacKenzie, Hamilton, Alfred C. D'Arcey, Danvers, and Alfred G. Cicchetti, Beverly, Mass., assignors to United Shoe Machinery Corporation, Flemington, N.J., a corporation of New Jersey Application August 27, 1957, Serial No. 680,511

62 Claims. (Cl. 1—104)

This invention relates to heel attaching machines and work conveying means for use therewith, it being an object of the invention to provide a machine by the use of which heels may be quickly and effectively attached to shoes by an inexperienced operator with a minimum amount of effort, the machine being similar in many respects to a heel attaching machine which is disclosed in United States Letters Patent No. 2,746,046, granted May 22, 1956, on an application filed in the names of Ferman N. Lee et al.

In the heel attaching machine disclosed in said Patent 2,746,046 and in various other types of heel attaching machines now in common use the services of a skilled operator are required, it being customary for the operator manually to mount the shoe, which is on a last, on a jack and with the assistance of a back gage to position the shoe by eye before its heel seat is forced against a heel in a heel gage and preparatory to driving fastenings such, for example, as nails into the heel and the heel seat of the shoe. With the above object in view and in accordance with a feature of the present invention applicants have provided an improved heel attaching machine comprising a gage for a heel, fastening inserting means arranged adjacent to said gage, power operated means comprising a jack for automatically feeding a shoe lengthwise from a loading and unloading position at a transfer station at a conveyor to a heel attaching station at the machine and for positioning in said heel attaching station the heel seat of the shoe carried by the jack in predetermined relation to said heel, power operated means for moving in said station the positioned shoe heightwise toward the heel in a predetermined path whereby to force the heel seat of the shoe against said heel, and means for operating said fastening inserting means to drive fastenings into the heel and the heel seat of the shoe to attach the heel to the shoe.

Lasts having shoes mounted on them are carried by and are positioned on pallets which are successively moved by an impeller or driver along the conveyor to the transfer station from a holdback station. Pallets, with and without lasts and accordingly shoes mounted on them, are fed by the impeller to the holdback station where they are detached by a holdback lever from the impeller and are retained in alined waiting positions at this station.

The leading pallet waiting at the holdback station may be released for movement from this station and be operatively connected to the impeller by the use of manually controlled power means comprising the above-mentioned holdback lever with the result that said leading pallet, which may or may not have work mounted on it, is moved to the transfer station where the jack, which has a coupling part adapted slidingly to receive a coupling portion of this pallet, is in waiting position. When the leading pallet which has left the holdback station is loaded, that is has work mounted on it, it is automatically disconnected from the impeller and is centralized on the jack at the transfer station by means provided for this purpose, the central heightwise plane of the heel seat of the shoe carried by the pallet then being coincident with a central heightwise plane of the heel positioned in the heel gage. In order automatically to move the pallet with work positioned on it from the transfer station to the heel attaching station there is provided, in accordance with a feature of the present invention, power means responsive to movement of the pallet with work on it to the transfer station for positioning the pallet on and clamping it to the jack, and for moving the jack along a rectilinear guide beam to the heel attaching station.

As the shoe and the pallet arrive at the heel attaching station the rear end of the shoe engages a back gage carried by the guide beam thereby positioning the shoe lengthwise with its heel seat arranged directly above the heel in the heel gage, engagement of the shoe with the back gage, in accordance with another feature of the invention, causing power means to move downward the guide beam, the jack, the pallet and the work mounted on the pallet whereby to cause the heel seat of the shoe to be forced against the attaching face of the heel and also causing drivers movable in passages of a nailing die forming part of the fastening inserting means to drive fastenings or nails into the heel and the heel seat of the shoe whereby to attach the heel to the shoe, the force acting to press the heel seat of the shoe against the heel always being a constant amount greater than the force required by said drivers to drive the nails into the work.

When the nails have been fully driven into the work the nail drivers are moved in the passages of the nailing die to lowered or retracted positions and the guide beam, the back gage, the pallet, and the last and the shoe together with its attached heel are raised to retracted positions in the heel attaching station. When the guide beam has been moved to its retracted position the jack is automatically moved by fluid pressure means along the guideway of the guide beam from the heel attaching station to the transfer station, the pallet disconnecting and centralizing means as well as the clamp, which is adapted to secure the pallet to the jack, at this time being adapted to cause the pallet to be coupled to the impeller and to slide off the jack away from the transfer station and along the conveyor.

When a leading pallet which is waiting at the holdback station and has no work mounted on it is released from this station it moves automatically over the jack waiting at the transfer station and along the conveyor without being coupled to the jack and accordingly without traveling into and out of the machine, suitable control mechanism being provided for this purpose. As a leading pallet leaving the holdback station travels along the conveyor toward the transfer station it renders reset mechanism active to move the holdback lever back to an active position whereby to prevent the pallet approaching the holdback station to be held at this station until a pair of manually controlled "palm" switches are operated. When the pallets do not have work mounted on them they may be released one after the other since they move continuously over and past the jack waiting at the transfer station and along the conveyor away from this station. It will be noted, however, that when the released pallet, which has work mounted on it, travels through the machine and back to the conveyor as above described it is desirable that the operator shall not release the following pallet waiting at the holdback station until the released pallet has moved back to and along the conveyor. There is thus provided, in accordance with a further feature of the invention, means responsive to movement of the pallet with work on it along the conveyor from the transfer station for preventing the holdback lever from being operated until a preceding pallet with work mounted on it has moved out of the transfer station and along the conveyor.

The heel attaching machine is provided with a loader block for supplying nails or fastenings to the passages of the nailing die, said block in accordance with another feature of the invention being operated by means responsive to movement of a pallet with work mounted on it as said pallet moves away from the transfer station along the conveyor. It is desirable that the loader block shall not be operated in response to movement along the conveyor of a pallet without work on it, otherwise a double load of nails would be delivered to the passages of the nailing die. With this consideration in view there is provided means for insuring against the operation of the loader block in response to movement of the pallet, which does not have work mounted on it, along the conveyor.

The present invention consists in the foregoing features and in novel features hereinafter described, reference being had to the accompanying drawings which represent one embodiment of the invention selected for purposes of illustration, said invention being disclosed in the following description and claims.

In the drawings,

Fig. 1 shows in perspective an illustrative heel attaching machine, a portion of a conveyor along which shoes, on the last and mounted on a pallet, are delivered to a jack of the machine at a transfer station, and transfer mechanism which comprises said jack and is adapted to deliver the pallet and accordingly work mounted on said pallet between the transfer station and a heel attaching station of the machine;

Fig. 3 is a front view, partly in section, showing portions of the conveyor and the heel attaching machine;

Fig. 4 is a view on the line IV—IV of Fig. 3 showing a portion of one of the pallets with work mounted on it at the transfer station preparatory to being moved to the heel attaching station;

Fig. 5 is a view, partly broken away and partly in section, along the line V—V of Fig. 3 showing the transfer mechanism with its jack, upon which one of the "loaded" pallets is mounted, about to be moved to the heel attaching station of the machine;

Fig. 6 is a plan view, partly in section and partly broken away, showing portions of the conveyor and the transfer mechanism of the machine;

Figs. 7 and 8 are side and bottom views respectively of one of the pallets;

Fig. 9 is a section on the line IX—IX of Fig. 10;

Fig. 10 is a side view, partly in section and partly broken away, of one of the pallets with a last mounted on it in a rest position at the transfer station;

Fig. 11 is a bottom view of the jack on the line XI—XI of Fig. 10;

Fig. 12 is a schematic diagram showing fluid pressure means for operating the illustrative machine;

Fig. 13 is a wiring diagram for use in describing the operation of the combined conveyor and machine;

Figure 1:
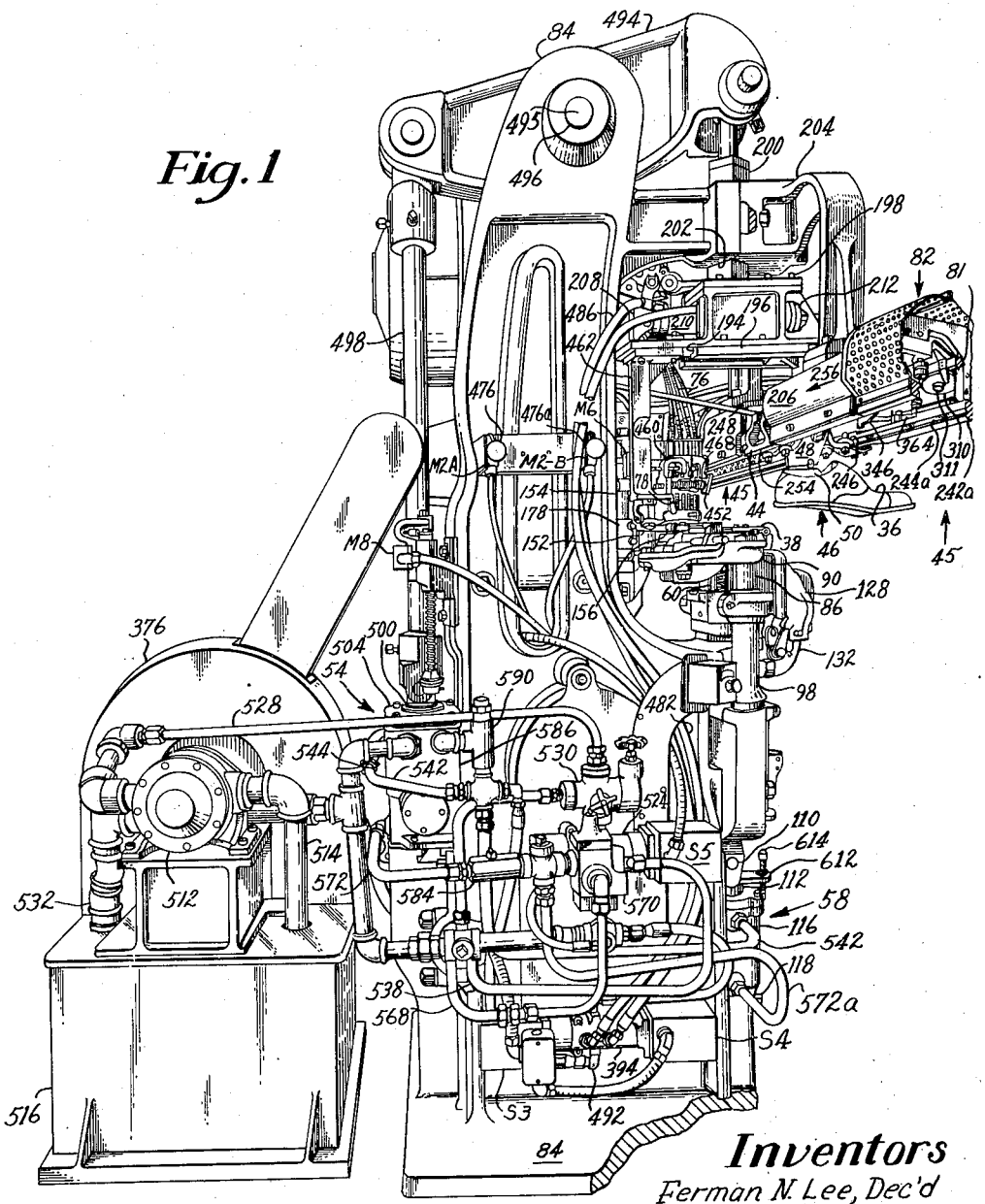

The illustrative machine is described with reference to the attachment of a composite heel 28 (Figs. 14 and 15), which includes a rubber lift 30 and a base lift 32 cemented or "spotted" to said rubber lift, to a heel seat 34 of a shoe 36 and comprises a carriage or slide 38 having secured to it a heel form or gage 40, which is provided with a cavity 42 of suitable shape to receive the rubber lift, and a carrier or jack 44 (Figs. 1, 5, 6, 10 and 12). The jack 44, which may also be referred to as a support, is movable between a loading and unloading position, where it receives at a transfer station 46 from a conveyor 45 a holder or pallet 48 adapted to carry a last 50 which has a heel plate 51 (Figs. 14 and 15) and upon which the shoe 36 is mounted, and a heel attaching or operating station 52 where the heel seat 34 of the shoe is forced against the heel in the form 40 first under primary or preliminary pressure and then under secondary or augmented pressure by hereinafter described mechanism operatively connected to fluid pressure means 54 (Figs. 1 and 12). The transfer station 46 may be hereinafter referred to as a loading and unloading station and the pallet 48 may be referred to as a carrier.

Figure 14:
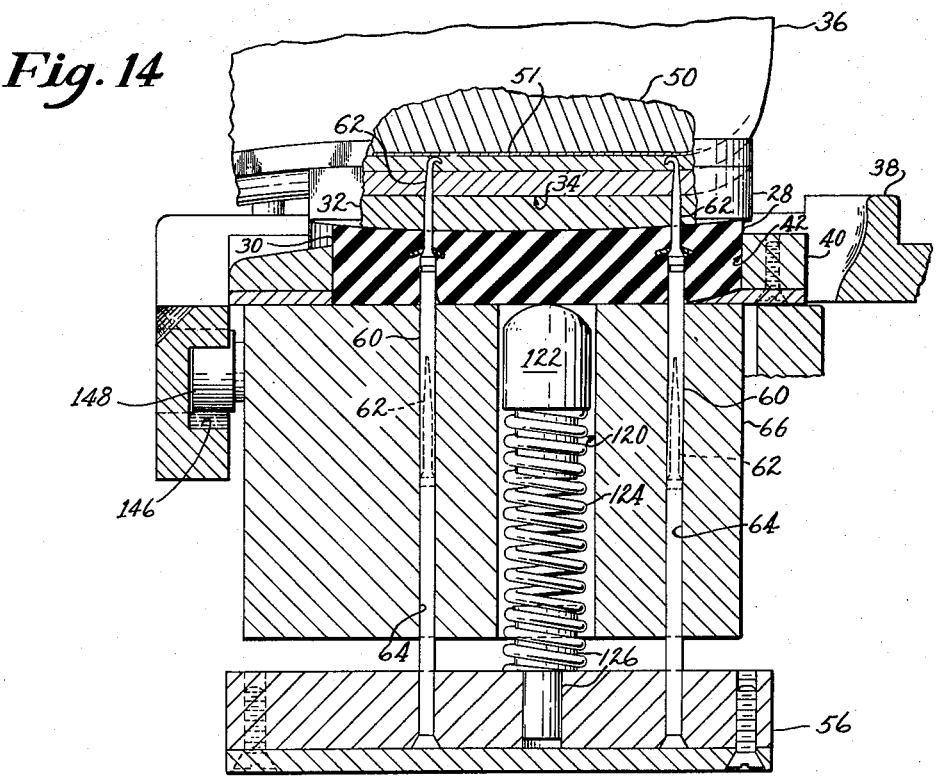
Fig. 14 is a longitudinal vertical section partly on the line XIV—XIV of Fig. 3 showing a nailing die and a driver head of the machine.
Figure 15:
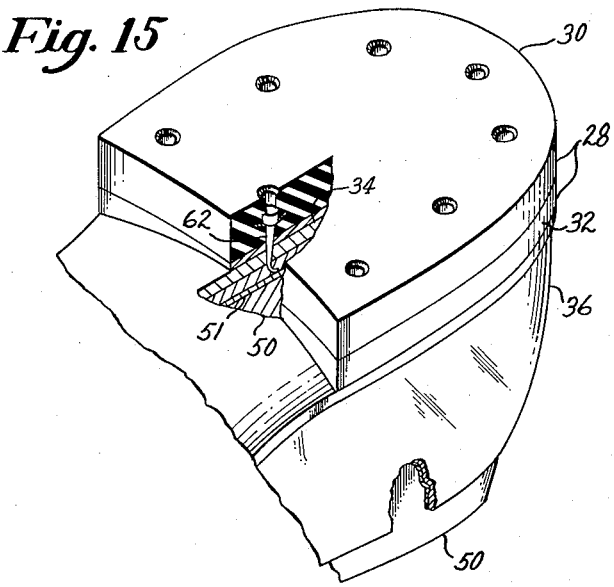
Fig. 15 is a perspective view, partly in section, showing the rear end portion of a shoe to which a rubber heel and its base lift have been attached by the use of the machine.

When the heel seat 34 of the shoe 36 has been forced against the heel 28 with preliminary pressure, a driver head 56 (Figs. 2, 12 and 14) is raised by fluid pressure means 58, which is open to and operated in timed sequence with the fluid pressure means 54, causing drivers 60 secured to said head to drive nails or fastenings 62, which are then in passages 64 of a nailing die 66, into the heel 28 and the heel seat 34 of the shoe to their clenched positions shown in Fig. 14 whereby to attach the heel to the shoe. As the nails 62 being driven into the work meet resistance pressure of fluid in said fluid pressure means 58 and in the fluid pressure means 54 builds up and causes the heel seat 34 of the shoe 36 to be forced downward against the heel 28 with secondary pressure which is additional to said preliminary pressure and, as will be hereinafter explained, is substantially equal to the upward pressure exerted by the driver head 56 in forcing the nails 62 into the work. The form 40, which may be regarded as a heel positioning abutment, may be considered as forming part of the nailing die 66.

After the nails 62 have been driven predetermined distances into the heel and the heel seat 34 of the shoe 36 by the drivers 60 the drivers are automatically lowered by mechanism hereinafter described to their retracted positions shown in Fig. 2 and simultaneously therewith the jack 44 and accordingly the pallet 48, the last 50 and the shoe 36 to which the heel 28 has been attached are raised as a unit at the heel attaching station 52 and are thereafter moved forward in a longitudinal path to the transfer station 46 where the pallet and the work mounted on it are unloaded from the jack and are delivered back to the conveyor 45.

The nails or fastenings 62 are delivered to the passages 64 of the nailing die 66 by a loader block 68 (Fig. 2) which has nail passages 70 and is automatically swung, by mechanism hereinafter described, between a raised or nail receiving position beneath a foot plate 72, which forms part of a replaceable "beer mug" or tube holder 74, and a nail discharge position over the nailing die 66. Nails 62 are delivered to the loader block 68 in its rest or waiting position beneath the foot plate 72 through upper and lower tubes 76, 78 which are arranged in a predetermined "pattern" or "design" in accordance with the selected tube holder 74 which receives said nails from a nail distributor 80 generally similar to the nail distributor disclosed in United States Letters Patent No. 1,381,240, granted June 14, 1921, on an application filed in the name of Joseph H. Pope, improved as disclosed in United States Letters Patent No. 2,319,797, granted May 25, 1943, on an application filed in the name of Wallace M. Cutler.

The pallets 48 which carry the lasts 50, having the shoes 36 mounted on them, are moved in succession along the conveyor 45 by a continuously moving endless driver or impeller 81 (Fig. 3) and after being uncoupled from the driver are arrested in a waiting position at a holdback station 82 where the loaded pallets are later successively coupled to the impeller in response to hereinafter described means for movement to the transfer station 46. When the pallet 48, to which the last 50 is secured by means hereinafter described, has been moved to the transfer station 46 it is automatically positioned upon and secured to the jack 44, is then transferred with said jack to the heel attaching station 52 where the heel 28 positioned in the form 40 is attached to the shoe, and is thereafter returned to the transfer station where it is released from the jack and is coupled to the impeller or driver 81 for delivery along the conveyor 45.

The illustrative machine, which as above explained is similar in many respects to the machine disclosed in the aforesaid Patent 2,746,046, comprises a main frame 84 (Figs. 1 and 2) which supports the various operating parts of the machine. Threaded into and secured to the main frame 84 is a pair of rods 86 upon shoulders 88 of which rests a bracket 90 secured by nuts 92 to said rods. The bracket 90 has formed in it a cavity 94 for receiving the nailing die 66 which is held in its operative position in the bracket by a latch plate 96. Positioned beneath the bracket 90 and having sleeve portions, which are mounted slidingly upon the rods 86, is a crosshead 98 comprising an adjustment slide 100 provided with a pair of undercut guideways 102 for receiving the driver head 56 to which, as above explained, the lower ends of the drivers 60 are secured as best shown in Fig. 14. The lower ends of the rods 86 are provided with shoulders 104 adapted to be engaged by the sleeve portions of the crosshead 98 in order to limit downward movement of the crosshead a depending shank 106 of which is movable along a vertical guideway 108 of the main frame 84 and is coupled by a pin 110 to the upper end of a piston or actuator 112 movable along a bore 114 of a cylinder 116 having a depending boss which fits in a bore 117 (Fig. 12) of the main frame and is secured to said frame by a plurality of screws 118 (only one shown).

The nailing die 66 together with a corresponding driver head 56 and a set of drivers 60, which extend into the passages 64 of the nailing die, are initially inserted respectively as a unit into the cavity 94 of the bracket 90 and the guideways 102 of the adjustment slide 100 of the crosshead 98, said nailing die being held in its operative position in the cavity by the latch plate 96. It will be understood that nailing dies 66 and associated driver heads 56 having passages 64 and drivers 60, respectively, of different patterns may be used interchangeably in the machine in accordance with the size and style of the work to be accommodated.

As will be explained later, the nailing die 66 has extending vertically through it a bore 120 (Figs. 3 and 14) for receiving a stripper plunger 122 which is mounted on the upper end of a spring 124 having its lower end seated on a stud 126 carried by the driver head 56. Prior to providing the stripper plunger 122 it was found that during the heel attaching operation the rubber lift 30 of the heel 28 had a tendency to bind in the holder or form 40 during the heel attaching operation thus causing the last 50 occasionally to be pulled off the holder or pallet 48 as the jack was raised away from the nailing die 66 at the heel attaching station 52. As the shoe 36 and its attached heel 28 are raised in response to upward movement of the jack 44 the plunger 122, operating against the rubber lift 30 of the heel, is forced upward by the then loaded spring 124 with sufficient pressure to insure against the last 50, upon which the shoe is mounted, being pulled off the pallet by reason of the rubber lift of the heel "sticking" in the cavity 42.

The driver head 56 and the drivers 60 are normally hidden from view by a cover 128 which is journaled on trunnions 130 (Fig. 2) carried by a bifurcated lug 132 secured to and forming part of the main frame 84 and which may be swung forward and downwardly to a lowered position preparatory to removing the nailing die 66 and its associated driver head 56 and drivers 60 from the machine. It will be noted at this point that when the cover 128 is in a raised position shown in Figs. 2 and 5, a screw 134 threaded into it causes a plunger 136 of a normally open switch M9 to bridge terminals of the switch, thus rendering, as will be hereinafter explained, current available for a trunk or terminal line 140 forming part of a plurality of automatically controlled circuits which are disclosed diagrammatically in Fig. 13 and are hereinafter referred to, and that when said cover is in a lowered position the switch is spring-opened and accordingly as a safety precaution the machine cannot be operated.

Secured to the bracket 90 is a transversely extending rod 142 which passes through a bore 144 (Fig. 2) of the carriage or slide 38 and serves transversely to guide said carriage, as will be explained later, over alined upper faces of the bracket and the nailing die 66. When the rubber lift receiving form 40 secured to the carriage or slide 38 is in its position shown in Fig. 2 its lower face substantially engages the upper face of the nailing die 66. As the carriage or slide 38 is moved to the left (Fig. 2) temporarily to "clear" the upper face of the nailing die 66 so that the nails 62 in the passages 70 of the loader block 68 may be dumped from the block into the passages 64 of the nailing die, the slide is tilted upward slightly about the rod 142 by reason of the engagement of a cam face 146 of the slide with a roll 148 mounted on the bracket 90. The rubber lift receiving form 40 is initially positioned on and secured to the carriage or slide 38 by the use of a spring-pressed pin 150 which fits slidingly in a bore of the slide and may be manually retracted and allowed to move by spring action into an alined bore of the holder or form positioned on the carriage or slide.

Figure 2:
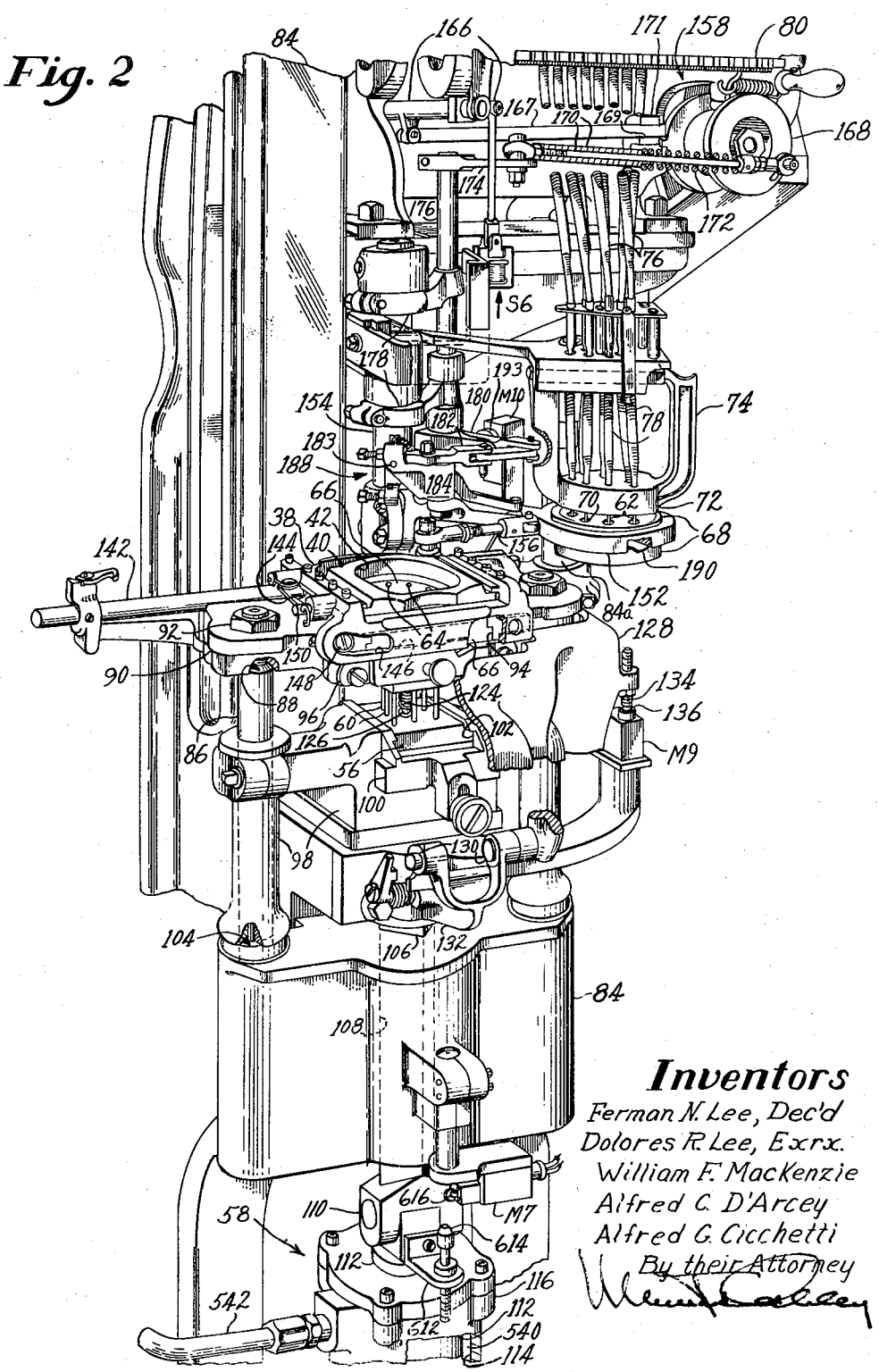
Fig. 2 is a perspective view of portions of the heel attaching machine as viewed from the front and the left of the machine.

In order to move the carriage or slide 38 to the left, as viewed in Fig. 2, over the nailing die 66 and the bracket 90 from its active position to "clear" the upper end of the nailing die 66 so as to allow the nails in the passages 70 of the loader block 68 to be dumped into the passages 64 of the nailing die 66, an arm 152, which carries said block and is pivotally mounted on a post 154 secured to the main frame 84, has pivotally connected to it a multipart rod 156 pivotally connected to the carriage or slide 38. The loader block 68 is rendered active in response to the engagement of a one-revolution clutch 158 of the nail distributor 80. As will be hereinafter explained, the clutch 158 is tripped in response to movement of the pallet or holder 48 along the conveyor 45 and away from the transfer station 46, said movement causing a solenoid S6 to be energized thereby moving clockwise (Fig. 2) a bell crank lever 166 operatively connected to the solenoid and sliding to the left an arm 167 which is pivotally connected to the bell crank lever and is slidingly supported in a slot 169 of a fixed guide 171. The clutch 158 effects rotation of a crank disk 168 which is rotatably mounted on a frame of the nail distributor 80 and has pivotally connected to it one arm of a telescopic rod 170 interengaging portions of which are attached to opposite ends, respectively, of a spring 172. The telescopic rod 170 is operatively connected to an arm 174 secured to the upper end of a vertical shaft 176 which is journaled in brackets 178 secured to the post 154 and has secured to its lower end an arm 180 pinned to one end of a toggle 182 the other end of which is operatively connected to a bearing sleeve or bracket 184 secured to the loader block arm 152 which, as above explained, is rotatable upon the vertical post 154.

Pivotally mounted upon a pin 183 carried by the bearing sleeve 184 is shutter controlling mechanism 188 which is similar to corresponding mechanism disclosed in detail in United States Letters Patent No. 2,274,777, granted March 3, 1942, on an application filed in the name of William S. Dallas and which, when the loader block 68 is in its rest position shown in Fig. 2, retains a shutter 190 movable in a slot (not shown) of said block, in a nail retaining position in the block and which releases said shutter when the loader block arrives in a nail delivering position over the upper end of the nailing die 66 thereby permitting nails 62 in the passages 70 of the block to be released so that they may fall by the action of gravity into the passages 64 of the nailing die. The rest position of the loader block 68 beneath the foot plate 72 is determined by engagement of the loader block arm 152 with a rod 84a forming part of the main frame of the machine, said arm being restrained in its rest position, if desirable, by mechanism such as disclosed in United States Letters Patent 1,157,688, granted October 26, 1915, on an application filed in the name of Lester L. Glidden. Since the power actuation of the loader block 68 and the operating connections of the loader block arm 152 with the carriage or slide 38 are old no further disclosure of this subject-matter is believed to be necessary herein. In order to insure that the machine cannot be operated through its cycle by means hereinafter described unless the loader block arm 152 is in its rest position against the rod 84a and accordingly the heel form is in a predetermined position at the heel attaching station 52, there is provided in a line 189 (Fig. 13) a normally open microswitch M10 having a plunger 193 which when the loader block 152 is in said rest position is forced across terminals of this microswitch by the arm 180 and serves when hereinafter described mechanism is manually actuated, to cause current to be available for this line to start the machine through its cycle. Should the loader block 68 fail to return to its rest position beneath the foot plate 72 the plunger 193 of the microswitch M10 will not bridge the terminals of this switch and accordingly, as will appear later, the machine cannot be operated through its cycle.

The mechanism which operates the loader block 68 is so constructed and arranged that immediately after the clutch 158 is tripped the loader block delivers nails 62 in the passages 70 of the block to the passages 64 of the nailing die 66 and returns to its rest position beneath the foot plate 72 of the tube holder 74. Nails which at this time are in a nail roll (not shown) of the nail distributor 80 are dumped into the tubes 76, 78 which deliver the nails to the foot plate 72 and accordingly to the passages 70 of the loader block 68. It sometimes happens that a bent nail being transferred from the passages 70 of the loader block 68 to the passages 64 of the nailing die 66 prevents said block from being moved back to its rest position beneath the foot plate 72 and whenever this occurs the spring 172 yields and the crank disk 168 driven by the one-revolution clutch 158 will return to its rest position. After the operator has manually dislodged the nail preventing the loader block 68 from returning to its rest position the loader block arm 152 is released and the spring 172, operating through the above described mechanism, biases the loader block back to its rest position.

The carrier or jack 44 comprises a supporting plate 192 (Figs. 3, 5 and 12) which is slidingly mounted along a guideway 194 of a guide beam 196 secured by screws 198 to the lower end of a plunger 200 vertically movable along a guideway 202 in an overhanging bracket 204 which is bolted to and forms, in effect, part of the main frame 84. The bracket 204 has laterally and downwardly projecting flanges to which is bolted a multipart housing 206 which forms part of the conveyor 45 and which carries mechanism for controlling admission of the pallets 48 and work mounted on them, one at a time, to the transfer station 46, mechanism for causing the pallets moved along the conveyor by the impeller 81 to be stopped and centralized on the jack 44 in its pallet loading and unloading or its pallet receiving and delivering position and means which, after the pallet attached to the impeller has been moved back to the conveyor and out of the transfer station, initiates the resetting of the various hereinafter described mechanisms of the machine and the tripping of the clutch 158 for operating the loader block 68. The guide beam 196 together with its associated mechanism for moving the work between the transfer station 46 and the heel attaching station 52 may be referred to as a transfer unit, and the guide beam may be described as having a guideway 194 extending between said stations.

Pivotally connected to a lug 208 secured to the guide beam 196 is a cylinder 210 in which is slidingly mounted a piston 212 the forward end of which is pivotally connected to an upstanding lug of the supporting plate 192 of the pack 44. The guide beam 196 has a depending arm 214 through the lower end portion of which is threaded a stop screw 216. When the machine is idle but powered, high-pressure oil available for a chamber 218 in the cylinder 210 is in engagement with a face 220 of the piston 212 and a detent or clamp 222, which is journaled upon a pin 224 secured to the jack 44, by its engagement with the stop screw 216, is held against the bottom of a slot 226 formed in the jack. The detent 222 is constantly urged forward by a spring 228 housed in a recess 230 of the jack 44. When the jack is in its forward or pallet loading and unloading position at the transfer station 46 waiting for a pallet 48 to be delivered to it, a bevel face 232 of the detent 222 is retracted behind a bevel face 234 formed on a dovetail portion 236 of the jack and, accordingly, a dovetail groove 240 of the pallet, which pallet is advanced along the conveyor 45 by the impeller 81, can be moved in sliding relation onto the dovetail portion of the jack. When the pallet 48 has been centralized on the jack 44, by mechanism hereinafter described, and the jack starts to move rearward away from the stop screw 216 mounted upon the depending arm 214 of the guide beam 196, the spring 228 forces the bevel face 232 of the detent 222 against a forward face of the dovetail groove 240 thereby securely holding the pallet on the jack during the time that it is presented to the machine to have the heel 28 attached to the shoe and while it is being moved back to its loading and unloading position at the transfer station 46. The dovetail portion 236 of the jack 44 and the portion of the pallet 48 in which the groove 240 is formed may be referred to as coupling portions of the jack and the pallet. The detent 222 which may be referred to as a clamp may be described as movable between an active clamping position and an inactive position.

As will be explained later, the conveyor 45 comprises inner and outer rails or tracks 242, 242a (Figs. 5 and 6) respectively, which may be referred to as guide rails and in which are formed V-shaped guideways 244, 244a in and along which wheels or rollers 246 journaled on the pallets 48 run. It will be noted that the multipart casting 206 has a break 248 (Figs. 1, 5, 6 and 12) extending heightwise through the casting at the transfer station 46 and, accordingly, a portion of the inner rail 242 included between faces 250 (Figs. 5 and 6) has been removed in order that the jack 44 may be moved to and from its loading and unloading position at the transfer station 46 of the conveyor 45, the jack 44 having secured to it by screws 252 a rail portion 254 having a V-shaped guideway 255 which, when the jack is in its loading and unloading position, is in alinement with adjacent portions of the V-shaped guideway 244 of the inner track 242. The faces 250 of the rails 242 may be said to be spaced by a gap.

As shoes 36 mounted upon lasts 50 and carried by the pallets or holders 48 move along the conveyor 45 toward the transfer station 46 their heel ends face "inward" of the conveyor that is, rearward of the machine, as best shown in Figs. 1, 3, 4, 5 and 6, said pallets traveling in the direction 256 along the tracks 242, 242a. The right and upper portions of the pallet 48 illustrated in Figs. 7 and 8, respectively, will be referred to as the forward end of the pallet and the left and lower portions of the pallet shown in Figs. 7 and 8 will be referred to as the rear or trailing end of the pallet. The conveyor 45 extends lengthwise in a closed path and the two side wheels or rollers 246 of the pallet 48 arranged nearest to the heel attaching station 52 and running in the groove 244 of the inner rail 242 of the conveyor will be referred to as the inner wheels or rollers of the pallet and the two side wheels or rollers 246 farthest away from the heel attaching station and running in the groove 244a of the outer rail 242a of the conveyor will be referred to as the outer wheels or rollers of the pallet.

It will be noted that the pallet or holder 48 per se is not our invention but, since said pallets cooperate with the various instrumentalities of the conveyor 45 and the heel attaching machine, an understanding of the construction and operation of the pallets is believed to be desirable. The pallets 48 are moved in succession in the direction 256 along the tracks 242, 242a of the conveyor 45 to the holdback or waiting station 82, which will be referred to later and is located just ahead of and outside the transfer station 46 where, as above explained, the pallets carrying the lasts 50 upon which the shoes are mounted are slidingly centralized upon the jack and are then moved to the heel attaching station 52. As above explained, after the heels 28 have been attached to the shoes 36 carried by the pallets 48, said pallets are moved back to the transfer station 46 where they are released and are delivered by mechanism hereinafter described, back to the conveyor 45.

The wheels 246 of the pallet 48 are mounted upon ball bearings 258 (Fig. 10) carried by screw and nut combinations 260 secured to front and rear legs 262, 264 of the pallet which has a depending portion to the bottom of which is secured a last pin 266 adapted to be received in a thimble hole 268 of the last 50. The screw and nut combination 260 which carries the rear outer wheel 246 has threaded into its upper end a cylindrical abutment 269 the purpose of which will be hereinafter explained. Secured to the back cone of the last 50, which as illustrated is a right last of the geometric type, is a top or positioning plate 270 having outer and inner side faces 272, 274 (Fig. 9) spaced and arranged to be engaged, respectively, by lugs 276, 278, which are secured to the depending portion of the pallet 48, when a face 280 of the top plate is in engagement with a bottom face 281 of said depending portion. By the use of geometric lasts 50, which are provided with top plates 270, and pallets 48, which are provided with lugs 276, 278, the heel seats of right and left shoes mounted on the lasts may be automatically centralized upon the pallets, said pallets always being so positioned in the conveyor 45 and the heel attaching machine that a longitudinal and heightwise median plane 283 (Figs. 4 and 6) of the heel seat of the shoe, irrespective of whether the shoe is a right or left, extends forwardly and rearwardly of the machine and is parallel to the lengthwise dimension of the guideway 194 of the guide beam 196. When the pallet 48 is arranged at the transfer station 46 as well as during the time that it is being transferred between the transfer station 46 and the heel attaching station 52 the median plane 283 of the heel seat of the shoe is coincident with a heightwise median plane through the heel holder 40 and accordingly through the heel 28 positioned in said holder. The last 50 and the means for positioning it on the pallet 48 are the subjects-matter of United States Letters Patent No. 2,806,233, granted September 17, 1957, in the names of Arthur R. Hubbard et al.

Secured by a screw 282 in a channel of the depending portion of the pallet 48 is a spring clip 284 which has a V-shaped end adapted to engage in a notch 286 formed in the top plate 270 of the last 50 whereby to hold the last upon the pallet. In order to insure that the face 280 of the top plate 270 of the last 50 on the pin 266 shall be held away from the lower face of the pallet 48 until said last has been rotated to its desired angular position in which it slides between the positioning lugs 276, 278 of the pallet, said pallet has rotatably mounted on it a roller 288.

Pivotally mounted in the pallet 48 is a bearing rod 290 having pinned to it a coupling and uncoupling bale 292 which extends around the forward end of the pallet and is constantly urged to a raised active position against a stop face 294 (Figs. 5 and 10) of the pallet by a torsion spring 296. Formed on the bale 292 is a bearing boss 298 having a bore in which is slidingly and pivotally mounted a pin 300 having secured to its upper end a coupler or driver finger 302 provided with a bevel face 304 which, when the bale is in a raised active position in engagement with the stop face 294, is engaged by one of a plurality of lugs 306 of the impeller 81. When the impeller 81 is powered it moves continuously lengthwise of itself, said impeller being generally V-shaped in cross section as shown in Fig. 5 and being supported in grooves 308 of outer guide rolls 310 which are rotatably supported on bearing pins 311 secured to the outer side of the conveyor 45, said impeller being held in said grooves by backing rolls 312 which are rotatably supported on bearing pins 313 secured to the conveyor housing 206 and are engaged by an inner face 314 of the impeller 81. The coupler 302 is normally held in its coupling position shown in Figs. 7 and 10 by a torsion spring 316 the upper end of which is attached to the coupler and the lower end of which is attached to a deflecting plate 317 formed integral with the bearing boss 298 of the bale 292.

When one of the pallets 48 which is on the conveyor 45 and has been disconnected from the impeller 81 by means hereinafter described, is stopped at the holdback or waiting station 82 and a following or trailing pallet coupled to the impeller approaches this station, the bale 292 of the following pallet engages an undercut cam 318 of the waiting pallet thereby deflecting the bale of the following pallet downward or clockwise as viewed in Fig. 7 against the action of the spring 296 and, accordingly, moving the drive finger or coupler 302 of the following pallet away from the lug 306 engaging said finger, with the result that said following pallet comes to rest at the holdback station behind the leading pallet waiting at this station. The bale 292 deflected downward by the cam 318 of the leading pallet 48 at the holdback station 82 underrides this cam and rests on a hook 320 which is pivotally mounted upon the rod 290 of the leading waiting pallet and is constantly urged to its position shown in Fig. 7 by a spring 321.

Extending heightwise through the depending portion of the pallet 48 are alined bores 322 having slidable in them a sensing rod or feeler 324 to which a collar 326 is pinned and which may be also referred to as a work testing rod. A spring 328, which surrounds the rod 324 and is interposed between the collar 326 and a face 330 of the pallet 48, forces the collar against an abutment face of the pallet causing, when there is no last 50 on the pallet (the pallet then being "unloaded"), the rod 324 to project beyond the bottom face 281 of the pallet, said rod then being in its inactive position. It will be noted that when the last 50 is mounted upon the pallet 48 the plunger 324 is in an active position in which it projects beyond the bottom of the dovetail groove 240 of the pallet as shown in Fig. 10. As the pallet 48 upon which the work is mounted slides onto the jack 44 stopped at the transfer station 46, the projecting upper end of the sensing rod 324 engages cam surfaces 331 of a lever 332, which is arranged in a channel 334 formed in the bottom of the jack 44 and is journaled on a shoulder screw 336 threaded into the jack, thereby causing this lever to be swung clockwise as viewed from below (Fig. 11). The lever 332 has an upstanding extension 338 into which is threaded a screw 340 arranged opposite a plunger 342 of a "tell-tale" microswitch M4 mounted on the jack 44. When the lever 332 is swung clockwise as viewed in Fig. 11 hereinafter described mechanism is rendered active to centralize the pallet 48 on the jack 44.

Figure 16:
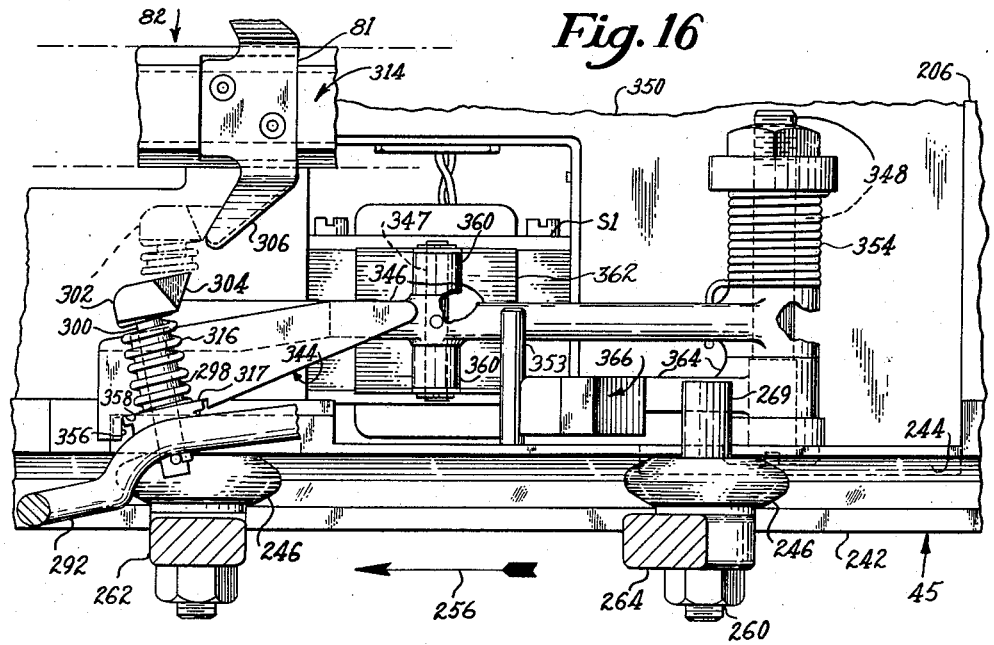
Fig. 16 is a section on the line XVI—XVI of Fig. 6 showing in detail mechanism for retaining pallets at a holdback station of the conveyor and for releasing them from this station.

As the pallet 48 moves in the direction 256 along the inner and outer rails 242, 242a of the conveyor 45 toward the holdback station 82 in response to the force exerted by one of the lugs 306 of the impeller 81 against the bevel face 304 of the coupler or drive finger 302 of the pallet 48, the deflecting plate 317 of the bale 292 of the pallet engages as shown in Fig. 16 an undercut cam surface 344 of a holdback lever 346 journaled on a vertical bearing rod 348 supported by lugs formed integral with a plate 350 secured by screws 352 (Fig. 6) to the multipart casting 206 which forms part of the conveyor.

The holdback lever 346 is constantly urged counterclockwise, as viewed from above (Fig. 6), to an active pallet stopping, or effective position in which it is in engagement with a stop 353 secured to the casting 206, by a torsion spring 354. As the bale 292 of the pallet 48 is swung downward by the engagement of its deflecting plate 317 with the cam surface 344 of the holdback lever 346, the forward or leading end of the bale is depressed to its full line position shown in Fig. 16 in which the coupler or driver finger 302 carried by the bale is moved away from the impeller lug 306 which heretofore acted upon the coupler. When the deflecting plate 317 engages a shoulder 356 of the holdback lever 346 the pallet 48 comes to rest at the holdback station 82, said plate entering a recess 358 formed in part by the shoulder 356. The holdback lever 346 carries a pin 347 operatively connected by upper and lower links 360 to a plunger 362 of a solenoid S1 secured to the plate 350.

Mounted upon the vertical bearing rod 348 and arranged beneath and supporting the holdback lever 346 is a bell crank lever 364 a rear arm of which has an abutment face 366 and a front arm of which is arranged opposite a plunger 368 of a normally open micro switch M3 secured to the plate 350, said lever 364 being constantly urged counterclockwise, as viewed from above, by a spring 370 to a rest position in engagement with a fixed stop face 372 forming part of a casing of the solenoid S1. When the lever 364 is in its normal position shown in Fig. 6 its abutment face 366 is in a position adapted to be engaged by the cylindrical abutment 269 of the pallet 48 as said pallet, as will be explained later, moves from the holdback station 82 toward the transfer station 46.

Power for operating the fluid pressure means 54, 58 of the illustrative machine is provided by a motor 376 operated by current supplied by lines 378 wired to a primary coil 380 of a transformer T. Connected to one end of a secondary coil 382 of the transformer T is the above referred to trunk line 140 and connected to the opposite end of said secondary coil is a trunk line 140a, said lines having bridging them a plurality of automatic control circuits hereinafter described. In order to power the machine the operator depresses a plunger 384 of a starting switch 386 across terminals of this switch causing a coil K of a relay to be energized and accordingly closing normally open switches K–A, K–B and K–C of this relay. The closing of the switch K–A causes the motor 376 to start thereby powering the fluid pressure means 54, 58 the operation of which is controlled by means hereinafter described. The closing of the switch K–B causes current to be available for the trunk line 140 and the closing of the switch K–C establishes a holding line 388 so that the plunger 384 of the normally open switch 386 may be released by the operator after it has been depressed without deenergizing the relay coil K. The closing of the switch K–B also causes pilot lights 390 of the machine to be lighted. Overload relays OR are also provided.

As above explained, the normally open switch M9 is closed only when the cover 128 for the nail driving apparatus is in a raised or closed position in which the screw 134 carried by said cover depresses the plunger 136 of the switch M9 across terminals of this switch as best shown in Figs. 2 and 13. Such a construction insures against the machine being operated while the driver head 56, the drivers 60 and the loader block 66 are being changed, the cover at such time hanging down from the trunnions 130 on which it is mounted and the switch M9 being open.

It will be noted that when the machine is idle and the control voltage has been impressed upon the wiring circuit shown in Fig. 13 a jack return solenoid S4 is energized through a normally closed switch K4–C, thereby insuring that a spool 392 of a transfer valve 394 shall be moved to the right as viewed in Fig. 12, against the action of spool centralizing springs 396 into engagement with a face 397 of the valve 394. Accordingly, oil under regulated pressure hereinafter referred to is available at this time for the face 220 of the piston 212 thus insuring that the jack 44 shall be held securely in its pallet loading and unloading position at the transfer station 46.

When one of the pallets 48 having work mounted on it is waiting at the holdback station 82 and a circuit controlling the operation of the solenoid S1 has been opened and reset, as will be hereinafter explained, in response to the engagement of the cylindrical abutment 269 of the preceding pallet 48 with a face 398 of a lever 400 (Fig. 6) as said preceding pallet moves along the conveyor 45 away from the transfer station 46, the machine is ready to receive another pallet from the holdback station. At this time nails 62 rest in the passages 64 of the nailing die 66 as the result of the loader block 68 having been operated through its cycle in response to the tripping of the one-revolution clutch 158 which is responsive to clockwise movement (Fig. 6) of the lever 400. The lever 400 is fulcrumed on a bearing rod 402 mounted in lugs forming part of a plate 404 secured by screws 406 to the casting 206, said lever being constantly urged to an idle position against a stop 408, which is secured to said casting, by a spring 410. A face of a forward arm of the lever 400 is engaged by a plunger 412 which forms part of a switch M1 and normally bridges terminals a—a in a line 414 when the lever 400 is in engagement with the stop 408. When the lever 400 is swung clockwise, as viewed in Fig. 6, by the cylindrical abutment 269 of the pallet 48 having left the transfer station 46, it causes the plunger 412 to leave the terminals a—a and to bridge terminals b—b of the switch M1 thereby effecting, as will be hereinafter explained, the tripping of the clutch 158 as well as the opening and resetting of a circuit which includes the solenoid S1 and controls the release of the pallet 48 at the holdback station 82.

As the pallet 48 is received by the dovetail portion 236 of the jack 44 waiting at the transfer station 46, the projecting upper end of the sensing rod 324 moves along the channel 334 in the bottom face of the jack causing the lever 332 to swing clockwise as viewed in Fig. 11 (counterclockwise as viewed from above), thereby causing, by the provision of means which will presently be described, the pallet entering the transfer station to be disconnected from the impeller 81 and to be centralized on the jack.

Figure 17:
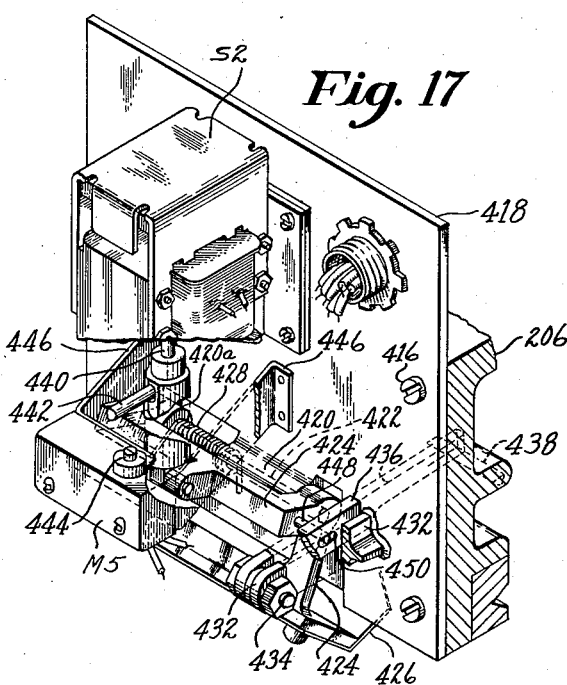
Fig. 17 is a view showing in perspective on an enlarged scale pallet controlling mechanism at the transfer station.

Secured by screws 416 to the front central portion of the casting 206 of the conveyor 45 is a plate 418 having secured to it a pair of bored bosses 420, 420a (Figs. 3, 6 and 17) adapted rotatably to support a bearing rod 422. Journaled on the bearing rod 422 is a yoke-shaped bell crank lever 424 having a depending arm to which is secured by screws a wedge-shaped centralizing plate 426 which, when swung counterclockwise is viewed in Fig. 5, has up standing converging end faces thereof moved into engagement with the outer front and rear wheels 246 of the pallet 48 thereby centralizing said pallet on the dovetail or coupling portion 236 of the jack and preventing movement of the pallet on said jack. The bell crank lever 424 is constantly urged clockwise as viewed in Fig. 5 by a torsion spring 428 opposite ends of which are attached respectively to the boss 420 and to the lever, clockwise movement of the lever being limited by the engagement of a plunger 440, which is pivotally connected to a forwardly projecting arm of the lever, with a stop (not shown) of a solenoid S2 secured to the plate 418. The plate 418 has a forwardly projecting flange 432 supporting a bearing pin 434 upon which is fulcrumed an arm 436 having at its rear end a depresser portion 438 which overlies the deflecting plate 317 of the bale 292 of the pallet 48 arriving at the transfer station 46. The plunger 440 carries a pin 442 which is adapted, upon downward movement of this plunger, to depress a plunger 444 of a microswitch M5 carried by a bracket 446 secured to the plate 418. Secured to the bell crank lever 424 is a pin 448 which passes through a slot 450 in the arm 436 and serves to rotate the arm about the bearing pin 434 in response to movement of the lever.

In moving from the transfer station 46 to the heel attaching station 52, the jack 44, which carries the pallet 48 and the shoe 36 on the last 50 supported by the pallet, is moved rearward along the rectilinear guideway 194 until the rear end of the shoe, acting against a back gage plate 452, has forced a slide plate 456, upon which the back gage plate is carried, against a stop screw 468. The slide plate 456 is movable forward and rearward in a rectilinear path on parallel headed bearing rods 458 which are fixed to a hook shaped flange 460 screwed to a depending bar 462 attached by screws 464 to the guide beam 196. The slide plate 456 is constantly urged forward on the bearing rods 458 by springs 466 which encircle said rods and forward and rearward ends of which engage respectively the slide plate and the flange 460, forward movement of the slide plate being limited by its engagement with heads of said bearing rods. The stop screw 468 is threaded into the hook-shaped flange 460 and is initially secured in its initial position by a nut 469. The back gage plate 452, together with mechanism which supports it and the stop screw 468 which limits rearward movement of the slide plate 456, may be collectively described as a back gage.

The slide plate 456 has secured to it a pin 470 which, just before the plate engages the stop screw 468, yieldingly forces a rod 472, which is slidingly mounted in the flange 460 and is constantly urged forward by a spring 471, against a plunger 474 of a back gage microswitch M6 thereby moving said plunger from its normal bridging position across terminals d—d of this microswitch to a bridging position across terminals e—e of the microswitch, with the result that the guide beam 196 is lowered, by means hereinafter described along the vertical guideway 202, to force the heel seat of the shoe against the heel 28 mounted in the holder 40.

As above explained the machine is described with reference to shoes which are mounted on geometric lasts the front or work engaging face of the back gage plate 452 extending toward the toe of the shoe presented to it at an angle alpha of approximately 7° as it extends away from the bottom of the shoe. As explained in detail in Letters Patent of the United States No. 2,881,440, granted April 14, 1959, in the names of Vernon L. Meyer et al. and also in United States Letters Patent No. 2,877,460, granted March 17, 1959, in the names of Ferman N. Lee et al., when shoes, which are mounted on geometric lasts and are of different sizes, have their rear ends in engagement with the back gage plate 452 of the type herein disclosed and the slide plate 456 is in engagement with the stop screw 468, the heel seat of the shoe, which has already been centralized laterally on the pallet 48 by mechanism above described, is properly positioned directly above the heel 28 in the heel holder, the construction and arrangement being such that when the guide beam 196 is moved vertically downward along the guideway 202 the shoe will be properly positioned upon the heel in the holder. The shoe positioned as above described may be said to be in a lengthwise measured position at the back gage, the jack 44 thereafter being moved vertically by the guide beam 196 from said measured position to a clamping position at the heel attaching station 52.

When, as previously explained, the pallet 48 bearing the shoe 46 which has had its heel 28 attached, is moved a short distance along the conveyor from the transfer station 46 and the support controlling the operation of the solenoid S1 has been reset in response to actuation of the lever 400, plungers 476, 476a of a pair of normally open "palm" switches M2–A, M2–B respectively are manually depressed simultaneously by the operator causing, through then closed microswitch M10 and normally closed switches K2–D, K5–B of relays embodying coils K2, K5 respectively, the energizing of a coil K1 of a relay and the closing of normally open switches K1–A and K1–B of said relay. The closing of the switch K1–A establishes a holding circuit to maintain the coil K1 energized after the palm switches M2–A and M2–B have been released and the closing of the switch K1–B energizes the solenoid S1, with the result that the holdback lever 346 is swung forward to its inactive or ineffective position against the action of the torsion spring 354 and releases the bale 292 of the pallet 48 stopped at the holdback station 82, thus allowing said bale to be raised to its active position by the torsion spring 296 of the pallet thus moving the coupler or drive finger 302 carried by said bale into a position in which it is engaged by one of the lugs 306 of the impeller 81.

The pallet 48 at the holdback station 82, after being engaged or "picked up" by one of the lugs 306 of the impeller 81 is moved toward the transfer station 46, the cylindrical abutment 269 of the pallet during this movement engaging the face 366 of the lever 364 and, accordingly, moving this lever clockwise as viewed in Fig. 6 against the action of the spring 370 thereby causing the plunger 368 to bridge the terminals of the normally open microswitch M3. The closing of the microswitch M3 causes the relay coil K5 to be energized thereby closing a normally open switch K5–A of a relay embodying this coil to establish a holding circuit supplying current to the relay coil K5 when the microswitch M3 is released after the abutment 269 of the pallet 48 has moved past the bell crank lever 364, and opening the normally closed switch K5–B of a relay embodying the coil K5 with the result that the relay coil K1 is de-energized causing the holding circuit, including the normally open switch K1–A, to be opened and causing the switch K1–B to be opened and the solenoid S1 to be deenergized and thus allowing the lever 346 acted upon by the torsion spring 354 to swing back against the stop 353 to its waiting or active position shown in Fig. 6. The presence of the relay including the coil K5 insures that the holdback lever 346 shall be reset even though the operator holds both of the palm switches M2–A and M2–B closed, the resetting being accomplished by reason of the fact that the relay coil K5 is maintained energized through the palm switches M2–A and M2–B, the microswitch M10, the normally closed switch K2–D and normally opened switch K5–A and consequently the normally closed relay switch K5–B is held open and, accordingly, the relay coil K1 is de-energized so long as the palm switches are held closed.

As the pallet 48 with the work mounted on it continues to move to the transfer station 46 the upper end of the sensing rod 324, carried by and extending above the "floor" of the dovetail groove 240 of the pallet, cams the lever 332 clockwise as viewed in Fig. 11 (counterclockwise as viewed from above), and accordingly closes the normally open microswitch M4 causing a coil K2 of a relay to be energized and a normally open switch K2–A of a relay embodying the coil K2 to be closed, thereby maintaining the coil K2 energized through a holding circuit comprising the microswitch M1 and the then closed switch K2–A, and also causing the solenoid S2 to be energized through a normally closed switch K3–C of a relay embodying a then de-energized coil K3. When the relay coil K2 is energized normally open and closed switches K2–C, K2–D of a relay embodying the coil K2 are closed and opened respectively.

The energizing of the solenoid S2 causes the plunger 440 to be lowered thereby swinging the bell crank lever 424 counterclockwise (Fig. 3) and accordingly the arm 436 clockwise and thus moving the coupler or finger 302 of the bale 292 of the pallet 48 at the transfer station 46 away from the associated lug 306 of the impeller 81 with the result that said pallet is disconnected from the impeller and, resisted by the lever 332, comes to rest at the transfer station 46. The lowering of the plunger 440 also causes the centralizing plate 426 carried by the bell crank lever 424 to be swung counterclockwise, as viewed in Fig. 5, between the outer front and rear wheels 246 of the pallet 48 to centralize the pallet on the jack 44 and to hold it centralized thereon. As above explained, when the pallet 48 is positioned on the jack 44 at the transfer station 46 the detent 222 of the jack has been swung back against the bottom of the slot 226 in the jack and is spaced slightly from the outer side of the dovetail groove 240 and, accordingly, the centralizing plate 426 in engagement with the outer wheels 246 of the pallet is relied upon to hold said pallet in its desired position on the jack. The closing of the switch K2–C connects the line 140 with a header line 467 between which and the trunk line 140a are a plurality of circuits which are established and opened in time relation by mechanism hereinafter described. As will be hereinafter explained the opening of the switch K2–D serves as a safety to insure that a leading pallet 48 waiting at the holdback station 82 cannot be released until a leading or preceding pallet with work on it has moved along the conveyor 45 a predetermined distance from the transfer station 46.

As the centralizing plate 426 positions the pallet 48 on the jack 44 the pin 442 carried by the plunger 440 of the solenoid S2 forces the plunger 444 across terminals of the normally open microswitch M5 thereby energizing a coil K6 of a relay and accordingly closing a normally open switch K6–A of this relay and thus energizing a coil K4 which forms part of another relay and is maintained energized by the closing of a normally open switch K4–A in a holding line. The energizing of the coil K4 causes a normally open switch K4–B of the relay embodying the coil K4 to be closed and, through a normally closed relay switch K3–B and the plunger 474 which then bridges the terminals d—d of the back gage switch M6, effects the energizing of a transfer solenoid S3. The energizing of the relay coil K4 also effects the opening of the normally closed switch K4–C causing the solenoid S4 to be de-energized and closes a normally open switch K4–D which comprises part of the relay embodying the coil K4 and is included in a line 477. The relay including the coil K6 and the switch K6–A is a time delay relay for insuring that time is provided for the setting of the wedge shaped plate 426 in its pallet centralizing position before the jack 44 is moved rearward out of the transfer station 46.

The energizing and de-energizing of the solenoids S3 and S4 respectively causes the spool 392 of the transfer valve 394 to slide to the left (Fig. 12) into engagement with a face 479 of this valve, thereby rendering oil which is under regulated pressure in a port 478 of the transfer valve to be open to a port 480 of this valve, and thus to be available through a line 482 and a port 483 of the cylinder 210 for a face 484 of the piston 212. The face 220 of the piston 212 at this time is open through a port 485 of the cylinder 210, a line 486, a port 488 of the transfer valve, and a passage 490 of this valve to a sump line 492. Accordingly, the jack 44 is moved rearward from the transfer station 46 along the guideway 194 of the guide beam 196, the detent 222 swinging forward under the action of the spring 228 as the jack 44 leaves the transfer station 46, thus causing the pallet 48 to be firmly secured against movement on the jack.

The plunger 200, which carries the jack supporting guide beam 196, is operatively connected to the forward end of a lever 494 (Figs. 1 and 12) which is journaled on a bearing shaft 496 supported by the main frame 84 and is operatively connected to the upper end of a connecting rod 498 pivotally connected to a clamping piston or a clamp or holddown actuator 500 slidingly mounted in a cylindrical bore 502 of a cylinder 504 secured to the main frame. The piston 500 forms with the cylinder 504 upper and lower chambers 508, 510, respectively. It will be noted that distances D, D' between an axis 495 of the bearing shaft 496 and the axes of the pivotal connections between the lever 494 and the plunger 200 on the one hand and the lever and the connecting rod 498 on the other hand are equal, and accordingly an upward force imparted to the lever by the connecting rod will cause an equal downward force to be exerted against the plunger by the lever.

Power for operating the fluid pressure means 54, 58 of the machine is supplied by the motor 376 which drives a rotary pump 512 having an intake line 514 extending into a sump 516 containing oil 518. Extending between the pump 512 and a port 520 of a main or four-way valve 524 having a bore 526 is a pressure line 528 including a relief valve 530 which is normally set to "spill" oil through a line 532 back into the sump 516 when the pressure in the line reaches 1,000 lbs. per square inch. The four-way valve 524 includes a spool 534 which is slidable in the bore 526 and is operatively connected to a solenoid S5. When the machine is idle (the solenoid S5 at this time being deenergized), the spool 534 is held in its position shown in Fig. 12 against an end face 533 of the bore 526 by a spring 535, oil from the pressure line 528 flowing through a circular channel 536 in the spool into a line 538 leading to the upper end of the chamber 508 formed by the clamping piston 500 and the cylinder 504. Extending from the lower end of the chamber 508 (the machine at this time being at rest, but powered) to the upper end of a chamber 540 formed by the piston 112 and the bore 114 of the cylinder 116 is a line 542 having inserted in it a combined check and throttle valve 544 which serves to cushion and regulate the speed of the piston or actuator 112 back to its lowered or retracted position shown in Fig. 12. Oil flowing in the line 542 toward the chamber 508 of the cylinder 504 causes a sleeve 546, reciprocable in a large bore 548 of the throttle valve 544, to move to the left, as viewed in Fig. 12, against the action of a spring 550, thereby allowing oil to flow freely through passages 552 and 553 of the valve and thus allowing a substantially unrestricted flow of oil in the line 542 toward this chamber. Flow of oil toward the chamber 540 of the cylinder 116 (the sleeve 546 at this time being pressed against a face 558 of the valve 544) is restricted by a regulating screw 554 threaded into a housing of the valve and extending into a passage 556 which is formed in said housing and may be considered as forming part of the line 542. The speed of the piston 112 back to its retracted or starting position may be varied by initially adjusting the regulating screw 554.

Extending between a port 560 in the four-way valve 524 and a chamber 562, which is formed by a bore 564 of the clamping piston 500 and a vertical cylindrical projection 566 of the cylinder 504, is a branch or holddown line 568 open to the port 520 and accordingly to the high-pressure line 528 when the solenoid S5 has been energized and has moved the spool 534 against the action of the spring 535 into engagement with a face 569 of this valve. Oil in the line 568 is available through a sequence valve 570 and a line 572 for the lower chamber 510 of the cylinder 504 and through equalizing or transfer lines 572 and 572a for a chamber 574 of the cylinder 116. The sequence valve 570 may be of any well-known commercial type and comprises a spool 576 which is slidingly mounted in a bore 578 of the valve and is constantly urged toward a stop face 580 by a spring 582 the strength of which may be varied. When the pressure of the oil in the line 568 is raised to a predetermined amount (approximately 1,000 lbs. per square inch), the spool 576 is raised in the bore 578 against the action of the spring 582 a distance sufficient to render oil in the line 568 available for the lines 572, 572a which are open, respectively, to the chambers 510, 574 associated with the clamping and the driving pistons or actuators 500, 112.

When the machine is powered but idle, the solenoid S5 at this time being de-energized and the spool 534 of the valve 524 being in its position shown in Fig. 12 the branch or holddown line 568 is open to a port 575 connected to an exhaust or sump line 577. When the solenoid S5 is energized and the spool 534 of the valve 524 is moved into engagement with the face 569 of the valve 524 the line 538 is open to a port 579 which is connected to an exhaust or sump line 581. The various exhaust or sump lines, including lines 492, 577 and 581, are connected to a common sump line, not shown.

In order to insure that after the attachment of the heel 28 to the shoe 36 the jack 44 shall not be raised too fast and that oil suddenly displaced from the chamber 510 shall not have a tendency to cause overdriving of the piston 112, and accordingly the drivers 60, there is interposed in the line 572 a combined check and throttle valve 584 which is practically identical with the combined check and throttle valve 544, and accordingly does not need to be described in detail. The throttle valve 584 permits substantially unrestricted flow of oil in the line 572 to the chamber 510, but throttles to a considerable extent flow of oil from this chamber.

Extending from the line 542 to the upper end of a reservoir 586 adjacent to the cylinder 504 is a line 588 having coupled in it a relief valve 590 which is commonly set to open at a pressure of approximately 50 lbs. per square inch, this pressure being sufficient to cause the flow of oil from the pressure line 528 through the valve 524 and the line 538, readily to force the clamping piston 500 to the bottom of its stroke and then to flow through the line 542 into the chamber 540 to force the driver piston 112 to the bottom of its stroke. The line 542 is at all times in communication with the port 478 of the transfer valve 394 and provides fluid under pressure for moving the jack between the transfer station 46 and the heel attaching station 52. It will be noted that the flow of oil in the line 542 toward the chamber 540 is restricted by the valve 544, the screw 554 of which may be adjusted to insure that the driver piston 112 shall not hit the bottom of its associated cylinder with a heavy impact. Oil ejected from the chambers 510, 574 into the lines 572, 572a, respectively, during the movement of the clamping and the driving pistons 500, 112 back to their starting positions, is by-passed to the line 568 through a line 596 having in it a one-way check valve 598.

A line 592 connects the upper end of the reservoir 586 to the spill line 532. In order that the chamber 510 shall be readily supplied with oil when the clamping piston 500 is raised, oil from the reservoir 586 enters said chamber through a passage 591 which is open to the reservoir and has interposed in it a one-way check valve 593. Flow of oil from the chamber 510 to the reservoir 588 is prevented by the check valve 593. In order to insure that the driving piston 112 shall not be raised so high that it strikes the head of the cylinder 116, this cylinder has formed in it an exhaust port 601 which is open to an exhaust or sump line 603.

When the machine is powered but idle, oil from the pump 512 circulates through the pressure line 528 through the port 520, the channel 536, and a port 600 of the four-way valve 524, through the line 538 to the chamber 508 and with restricted flow through the line 542 to the chamber 540 and back through the line 588, the relief valve 590, the reservoir 586, and the exhaust line 592 into the sump 516. Accordingly, at this time the clamping and the driver pistons or actuators 500, 112 are in their lowered positions in engagement with faces 597, 599, respectively, of their associated cylinders 504, 116, respectively. During this period, the switch K4–C of the relay embodying the coil K4 is closed and the solenoid S4 is energized and accordingly the spool 392 of the transfer valve 394 is in engagement with the face 397 of this valve, thus allowing oil delivered by the line 542 to the port 478 of the transfer valve 394 to be available for the port 488 of this valve and therefore available for the line 486 and the port 485 of the cylinder 210 to cause oil under pressure to be forced against the face 220 of the piston 212, thereby insuring that the jack shall be held against movement in its loading and unloading position at the transfer station 46 in which the detent 222 is in engagement with the screw 216 carried by the arm 214 of the guide beam 196 and has been forced against the bottom of the slot 226.

After placing the heel 28 in the cavity 42 of the form 40, the operator closes the switches M2–A, M2–B with the result that mechanism above described becomes operative automatically to transfer the pallet 48 with work mounted on it from the holdback station 82 to the jack 44 at the transfer station 46. As above explained, the loaded jack 44 is moved rearwardly from the transfer station 46 along the rectilinear guideway 194 of the guide beam 196 until the rear end of the shoe 36 supported by said jack has moved to a position in which it has moved, by reason of its engagement with the back gage plate 452, the slide plate 456 against the stop screw 468, and has caused the yielding rod 472 to move the plunger 474 of the microswitch M6 away from terminals d—d in a line 602 and across terminals e—e in a line 604. When the plunger 474 is moved away from the terminals d—d the solenoid S3 becomes de-energized and the spool 392 of the transfer valve 394 is moved by the springs 396 to its neutral position causing the lines 482, 486 to be sealed, thereby locking the jack 44 against movement lengthwise of the guideway 194 of the guide beam 196. When the plunger 474 associated with the back gage has bridged the terminals e—e of the microswitch M6, the solenoid S5, which is in a line 604, is energized, causing the spool 534 of the valve 524 to be moved to the left, as viewed in Fig. 12 against the action of the spring 535 into engagement with the face 569 of the valve, thus rendering high-pressure oil at the port 520 of this valve immediately available for the line 568 and accordingly for the chamber 562 and a face 606 of the clamping piston or actuator 500. In the illustrative machine, the area of the face 606 is approximately one square inch, the pressure exerted against said face being approximately 1,000 lbs. per square inch, which may be varied in accordance with the setting of the relief valve 530. Pressure exerted against the face 606 of the clamping piston 500 causes this piston to be elevated, thereby effecting, through mechanism already described, the lowering of the guide beam 196 and the back gage plate 452, which is mounted for vertical movement with the beam at right angles to the lengthwise dimension of the guideway 194, until the heel seat of the shoe has been pressed with a preliminary downward force, which is equal to the upward force exerted against the lever 494 by the connecting rod 498 and is approximately 1,000 lbs., against the heel 28 mounted on the form 40.

It will be noted that when the clamping piston 500 is in its rest or lowered position shown in Fig. 12, a cam 605 carried by the connecting rod 498 bears against a plunger 607 of a normally open microswitch M8 in the line 477 and maintains this plunger in bridging relation with terminals of this microswitch. It will also be noted that when the piston 500 is raised to force with preliminary pressure the heel seat of the shoe 36 against the heel 28 in the form 40, the cam 605 moves away from its associated plunger 607, thus allowing the microswitch M8 to open and thus insuring that when a normally open microswitch M7 hereinafter described is closed, the solenoid S4 will not be energized.

When the heel seat of the shoe 36 has been forced with preliminary pressure against the heel 28 in the form 40, pressure in the line 568 is sufficient to cause the spool 576 of the sequence valve 570 to be raised in the bore 578 of this valve a sufficient distance to allow oil under pressure to be available for the equalizing or transfer lines 572, 572a, and accordingly for the chambers 510, 574 and faces 608, 610 of the clamping and the driver pistons or actuators 500, 112, respectively. The pressure at which the sequence valve 570 will transfer oil in the holddown line 568 to the equalizing or transfer lines 272, 272a may be varied by initial adjustment of the spring 582 of this valve, said pressure being just lower than the pressure at which the relief valve 530 is set to spill oil. It will be noted that the areas of the faces 608, 610 of the clamping and the driving pistons 500, 112, respectively are substantially equal, and that the pressure exerted against these faces by the oil is approximately the same. As driving pressure builds up in the chamber 574 as the nail drivers 60 meet considerable resistance this pressure is simultaneously operative against the face 608 of the clamping piston 500, causing the shoe 36 to be forced against the heel with a secondary force or pressure which is additional to the preliminary force or pressure of 1,000 lbs.

Pressure exerted against the face 610 of the driving piston 112 causes the drivers 60 to force the nails 62 then in the passages 64 of the nailing die 66 into the heel 28 and the heel seat of the shoe 36, and to clench them against the heel plate 51 of the last 50. It will be apparent that the downward pressure of the shoe against the heel is always greater than the upward pressure exerted against the nails 62 in driving them into the work by an amount which is equal to the force (approximately 1,000 lbs.) exerted against the face 606 of the piston 500, and which may be referred to as the holddown force or the differential force between the downward pressure applied against the work and the upward pressure against the work by the nails as said nails are being driven and clenched in the work. The holddown pressure exerted against the shoe 36 during the heel attaching operation will always be a predetermined amount greater than the pressure necessary to retain the work in position against the upward pressure of the nails 62 driven by the drivers 60. By automatically exerting against the shoe 36 during the heel attaching operation a selected force greater than that necessary to hold the work against the driving action of the nails 62, the "life" of the lasts used has been materially increased and the wear and tear on the machine has been substantially reduced.

In view of the foregoing it will be apparent that the equalizing or transfer lines 572, 572a are open to the piston or actuator 112 and the clamping piston or actuator 500 and cause the work pressing mechanism to be moved against the work with a force dependent upon the resistance encountered by the fastening-inserting mechanism. The illustrative machine may be said to have freely reversible connections between the jack 44 and the piston or actuator 500 and the piston 112 may be described as a driver actuator connected to the fastening-inserting means for freely reversible movement. The piston or actuator 500 may also be described as having primary and secondary faces 606, 608.

Threaded into a lug 612 secured to the piston 112 is a frusto-conical striker 614, which, when the nails 62 have been driven to the proper depth into the work and have been clenched against the heel plate 51 of the last 50, engages a plunger 616 of the above-mentioned normally open microswitch M7, causing said plunger to bridge terminals of this microswitch and thereby energizing the above-mentioned relay coil K3 which is held energized, after the plunger of the microswitch M7 has been released, by the closing of a normally open switch K3–A in a holding line. The energizing of the relay coil K3 also causes the opening of the normally closed switch K3–C of the relay embodying the coil K3 and, accordingly, the de-energizing of the solenoid S2 and the resetting of mechanism which stops and centralizes the pallet 48 at the transfer station 46. When the relay coil K3 is energized, the normally closed switch K3–B of the relay embodying the coil K3 is opened and de-energizes the solenoid S5, causing the spool 534 of the four-way valve 524 to move under the action of the spring 535 to its idle position shown in Fig. 12 against the face 533 of this valve. Oil from the pressure line 528 is now available for the lines 538, 542, respectively, leading to the upper chambers 508, 540 of the cylinders 504, 116, with the result that the pistons 500, 112 are moved to their lowered positions into engagement with faces 597 and 599, respectively, of said cylinders and, accordingly, the shoe 36 is raised to its dash-dot position shown in Fig. 5, and the driver head 56 is moved to its lowered starting position.

As the clamping piston 500 is moved to its lowered starting position, the cam 605 carried by the connecting rod 498, forces the plunger 607 of the normally open microswitch M8 across terminals of this switch, thereby closing the line 477 which, as above explained, is open during the time that the shoe is clamped against the heel in the form 40. When the line 477 is closed by moving the plunger 607 across the terminals of the microswitch M8, the solenoid S4 is energized, thus moving the spool 392 of the transfer valve 394 against the face 397 of this valve and thereby rendering oil in the port 478 of the valve available for the face 220 of the piston 212. Accordingly, the jack 44, the pallet 48, and the work mounted on it, are moved back to the transfer station 46 to a rest position in which the detent 222, which is carried by the jack, is forced against the bottom of the slot 226 by the screw 216 which is carried by the depending arm 214 of the guide beam 196. The solenoid S2 at this time is de-energized by reason of the normally closed switch K3–C having been open, and accordingly the wedge-shaped plate 426 and the arm 436 are in their idle, reset positions, the pallet 48, when moved to the transfer station 46 by the jack, being moved off the jack and out of said transfer station along the conveyor 45 by one of the impeller lugs 306 which engages the bevel face 304 of the coupler or drive finger 302 of this pallet.

As above explained, as the pallet 48, having the shoe 38 on the last 50 mounted on it, moves away from the transfer station 46 and along the conveyor 45, the cylindrical abutment 269 of said pallet engages the face 398 of the lever 400, thus moving the plunger 412 of the switch M1 out of and into bridging relation with the terminals a—a, b—b, respectively, of this switch, and therefore causing the relay coil K2 to be de-energized and the normally open switches K2–A, K2–C of the relay embodying the coil K2 to be opened. The opening of the switch K2–C serves to reset the switches of relays embodying the coils K3 and K4 to their positions shown in Fig. 13, preparatory to starting another cycle of the machine. When the relay coil K2 is de-energized, the switch K2–D of the relay embodying this coil is closed, thereby rendering it possible to release the pallet 48 waiting at the holdback station 82 when the plungers 476, 476a of the "palm" switches M2–A and M2–B, respectively, are again pressed. As above-explained, the switch K2–D is provided in order to insure that the pallet 48 at the holdback station 82 cannot be released until the immediately preceding pallet, which is loaded or has work mounted on it, has traveled out of the transfer station. At the time that the plunger 412 of the microswitch M1 is moved across the terminals b—b, the switch K3–D of the relay embodying the coil K3 is closed and, accordingly, the solenoid S6 is energized and trips the one-revolution clutch 158, causing nails 62 to be delivered to the nailing die 66 of the machine. It will be noted that because of the relay drop-out delay the plunger 412 bridges the terminals b—b before the switch K3–D is opened.

As above noted, the upper end of the sensing rod 324 of one of the pallets 48, without a last 50 mounted on it, does not project beyond the bottom or "floor" of the dovetail groove 240 of this pallet. Accordingly, when this pallet, which may be referred to as an empty pallet, is released from the holdback station 82 and moves along the conveyor toward the transfer station 46, it slides onto the dovetail portion 236 of the jack 44 but does not operate the lever 332 of the jack and therefore the microswitch M4 is not energized, the pallet, which is continuously moved along the conveyor 45 by the impeller 81, sliding continuously over and past the dovetail portion 236 of the jack 44 and out of the transfer station 46.

Since the empty pallet 48 moves continuously through the transfer station 46, and accordingly does not leave the conveyor, it will be apparent that the switch K3–D of the relay embodying the coil K3 is not closed at the time the plunger 412 of the microswitch M1 is actuated by the lever 400, and therefore the clutch 156 will not be tripped in response to movement of the empty pallet away from the transfer station 46, thus insuring against a double load of nails being dropped into the passages 70 of the loader block 68 in its rest position beneath the foot plate 72. Moreover, in view of the fact that the switch K2–D is never open when empty pallets 48 are released at the holdback station and travel continuously through and past the transfer station, the operator may successively release said empty pallets stopped at the holdback station 82 as soon as the solenoid S1 has been reset by a preceding pallet.

Having thus described our invention, what we claim as new and desire to secure by Letters Patent of the United States is:

1. In a heel attaching machine having a heel attaching station and a loading and unloading station, means located at said heel attaching station for supporting a heel, power means for moving a shoe between the heel attaching station and the loading and unloading station, power means responsive to movement of the shoe to the heel attaching station for moving in the heel attaching station the shoe toward the heel and for forcing a heel seat of the shoe against said heel, and means for inserting fastenings into the heel and the heel seat of the shoe to attach the heel to the shoe.

2. In a heel attaching machine, a nailing die, means for positioning a heel adjacent to the nailing die, a loading and unloading station spaced from the nailing die, a jack adapted to receive a shoe at the loading and unloading station, means for positioning and clamping the shoe against movement on the jack at the loading and unloading station, power means for automatically moving the jack and the shoe clamped on it from said loading and unloading station and for forcing the heel seat of the shoe against the heel and for thereafter returning the jack and the shoe to said loading and unloading position, and means for driving nails into the heel and the heel seat of the shoe while it is forced against said heel seat whereby to attach the heel to the shoe.

3. In a heel attaching machine, a support for a heel, nail driving means movable along said support, power operated means comprising a jack for automatically feeding a shoe from a loading and unloading station to a heel attaching station and for positioning at said heel attaching station the heel seat of the shoe carried by the jack in opposed relation to the heel, and power operated means operative in response to movement of the support to the heel attaching station for moving at said heel attaching station the shoe heightwise toward the heel and for forcing the heel seat of the shoe against said heel.

4. In a heel attaching machine, a nailing die, means for positioning a heel adjacent to the nailing die, a loading and unloading station spaced from the nailing die, a jack adapted to receive a shoe at the loading and unloading station, means for positioning and clamping the shoe on the jack at said station, fluid pressure means for automatically moving the jack from the loading and unloading station and for forcing the heel seat portion of the shoe on the jack against the heel, and fluid pressure means operative in timed relation with the first-named fluid pressure means for driving nails into the heel and the heel seat of the shoe against the heel to the shoe, said first-named fluid pressure means being operative in response to operation of said second-named fluid pressure means for automatically moving the jack and the shoe and its attached heel mounted on said jack back to the loading and unloading station.

5. In a heel attaching machine having a heel attaching station and a loading and unloading station, means located at said heel attaching station for supporting and positioning a heel, fluid pressure means for automatically moving a shoe between the heel attaching station and the loading and unloading station, fluid pressure means responsive to movement of the shoe to the heel attaching station for moving in the heel attaching station the shoe toward the heel and for forcing a heel seat of the shoe against the heel, and fluid pressure means for inserting fastenings into the heel and the heel seat of the shoe to attach the heel to the shoe.

6. In a heel attaching machine having a heel attaching station and a loading and unloading station, a jack for supporting a shoe, means located at the heel attaching station and adapted to support a heel, means for automatically moving the jack and the shoe supported by it between said stations, power means responsive to movement of the jack to the heel attaching station for moving at the heel attaching station the jack toward the heel supported by said first named means and for forcing a heel seat of the shoe against said heel, and means for inserting fastenings into the heel and the heel seat of the shoe to attach the heel to the shoe.

7. In a heel attaching machine, a form which is adapted to position a heel at a heel attaching station, a guide beam movable at the heel attaching station toward and away from said form, a jack movable on the guide beam between the heel attaching station and a loading and unloading station which is spaced from the heel attaching station and at which a holder upon which a shoe is mounted is loaded onto the jack, a back gage mounted on the guide beam and adapted to be engaged by the rear end of the shoe, power means for moving the jack on the guide beam between the loading and unloading station and the heel attaching station, power means responsive to the engagement of the rear end of the shoe with the back gage for moving the guide beam, the jack, and the holder and accordingly the shoe toward the heel positioned in said form to force a heel seat of the shoe against the heel, and means for driving nails into the heel and the heel seat of the shoe to attach the heel to the shoe.

8. In a heel attaching machine having a heel attaching station and a loading and unloading station, a nailing die at the heel attaching station, a form for positioning a heel on the nailing die, a guide beam movable toward and away from said form, a jack movable on the guide beam between the heel attaching station and the loading and unloading station, means for positioning and clamping on the jack at the loading and unloading station a pallet upon which a shoe is mounted, a back gage mounted on the guide beam, power means for moving the jack on the guide beam between the loading and unloading station and the heel attaching station, power means responsive to engagement of the shoe with the back gage for locking at the heel attaching station the jack against movement on the guide beam and for moving the beam, the jack, the pallet and accordingly the shoe toward the heel positioned by said form to force a heel seat of the shoe against the heel, and means for driving nails into the heel and the heel seat of the shoe to attach the heel to the shoe.

9. A heel attaching machine for use with a conveyor which has a transfer station and is adapted to deliver shoes successively to said station, said heel attaching machine comprising a jack for a shoe, a die adapted to be engaged by a heel at a heel attaching station, means for positioning the heel adjacent to the die, fluid pressure means for effecting at the heel attaching station relative movement between the jack and the die to force together the heel and a heel seat of the shoe, fluid pressure means for driving fastenings into the heel and the heel seat of the shoe at said heel attaching station to attach the heel to the shoe, and fluid pressure means operative in timed relation with the first-named fluid pressure means for moving the jack from the transfer station to the heel attaching station preparatory to attaching the heel to the shoe and for moving the jack from the heel attaching station to the transfer station after the heel has been attached to the shoe.

10. A heel attaching machine for use with a conveyor having an impeller and a transfer station to which pallets are moved successively by the impeller, said heel attaching machine having a heel attaching station and comprising means for supporting and positioning a heel at the heel attaching station, fastening inserting mechanism, a jack movable between the heel attaching station and the transfer station and adapted to receive at the transfer station a pallet which is moved to the transfer station by the impeller and which has mounted on it a last bearing a shoe, means for securing the pallet received by the jack to the jack, power means for retaining the jack at the transfer station when the machine is powered but idle, power means responsive to movement onto the jack of one of the pallets with the last mounted on it for moving as a unit the jack, the pallet, the last and the shoe mounted on the last to the heel attaching station, power means for moving the jack in the heel attaching station to force the heel seat of the shoe against said heel, means for operating the fastening inserting means to drive fastenings into the heel and the heel seat of the shoe whereby to attach the heel to the shoe, said power means being adapted to return the jack, the pallet and the last and the shoe mounted on the last as a unit to the transfer station, and means for releasing the pallet from the jack to enable the pallet to be removed from the jack for movement along the conveyor by the impeller.

11. A heel attaching machine having a jack and adapted for use with a conveyor along which holders for lasts having shoes mounted on them are moved in succession by an impeller along said conveyor and which comprises mechanism for releasing the holders at a transfer station from the impeller and for centralizing them on the jack waiting at this station, said machine comprising the jack which is adapted successively to receive the holders which are delivered to the transfer station by the impeller and are released from the impeller and which are centralized on the jack by said mechanism, a nailing die adapted to be engaged by a heel at a heel attaching station, nail driving means associated with the nailing die, a form for positioning a heel adjacent to the die, a guide beam, a back gage carried by the guide beam, fluid pressure means for moving the jack upon the guide beam between a loading and unloading position at the transfer station and a position in which the shoe is positioned lengthwise at the heel attaching station by engagement with the back gage, fluid pressure means responsive to the engagement of the shoe with the back gage for moving the guide beam and the jack as a unit toward said form and said nailing die and for forcing the heel seat of the shoe against the heel, and fluid pressure means for effecting operation of said nail driving means to cause nails to be inserted into the heel and the heel seat of the shoe to attach the heel to the shoe.

12. A heel attaching machine having a jack and adapted for use with a conveyor along which holders for lasts having shoes mounted on them are moved in succession by an impeller along said conveyor to a transfer station and which comprises mechanism for releasing the holders at the transfer station from the impeller and for centralizing them on the waiting jack at this station, said machine comprising the jack which is adapted successively to receive the holders which are delivered to the transfer station by the impeller and are released from the impeller and which are centralized on the jack by said mechanism, a nailing die adapted to be engaged by a heel at a heel attaching station, nail drivers associated with the nailing die, a form for positioning the heel adjacent to the die, a back gage, fluid pressure means responsive to movement of the holder releasing and centralizing mechanism for moving the jack from the transfer station to a position in which the shoe is positioned lengthwise at the heel attaching station by the back gage, and fluid pressure means which is responsive to the positioning of the shoe by the back gage and is adapted to move at said heel attaching station the jack toward the form and the nailing die and to force the heel seat of the lengthwise positioned shoe against the attaching face of the heel in said form, and fluid pressure means adapted to drive nails into the heel and the heel seat of the shoe to attach the heel to the shoe.

13. In a heel attaching machine, a nailing die adapted to be engaged by a heel at a heel attaching station, means for positioning and supporting the heel adjacent to said die at said station, a jack adapted to support a shoe and movable between the heel attaching station and a loading and unloading station spaced from the heel attaching station, a back gage, power means for moving the jack from the loading and unloading station to a measuring position at the heel attaching station in which position the rear end of the shoe is in engagement with the back gage, and power means operative in response to movement of the jack to its measuring position for moving at the heel attaching station the jack from said measuring position to a clamping position in which the heel seat of the shoe is forced against the attaching face of the heel.

14. In a machine for attaching heels to shoes, a nailing die adapted to be engaged by a heel at a heel attaching station, a gage for positioning a heel adjacent to the nailing die, a movable jack, means for positioning on and clamping to the jack a shoe with a heightwise median plane of the heel seat of the shoe coincident with a heightwise median plane of the heel positioned by said gage, nail drivers adapted to cooperate with the nailing die, power means for automatically moving the shoe from a loading and unloading station, which is spaced from the heel attaching station, to said heel attaching station with the heightwise median plane of the heel seat of the shoe maintained coincident with the heightwise median plane of the heel, a back gage for positioning the shoe lengthwise as it arrives at the heel attaching station, power means operative in response to movement of the shoe against the back gage for effecting at the heel attaching station between the nailing die and the heel positioning gage on the one hand, and the jack and the back gage on the other hand, relative movement of approach heightwise of the shoe to clamp together the heel and the heel seat of the shoe, and means for driving nails into the heel and the heel seat of the shoe whereby to attach the heel to the shoe, said second-named power means being adapted to effect at the heel attaching station relative movement of separation heightwise of the shoe between the nailing die and the heel positioning gage on the one hand and the jack and the back gage on the other hand, and said first-named power means being effective to move the jack and the shoe carried by it from the heel attaching station to the loading and unloading station.

15. A heel attaching machine for use with a conveyor which has a transfer station at which shoes mounted on pallets are successively presented to the machine and at which said shoes, which have been operated upon by the machine, are removed from the machine and returned to the conveyor, said heel attaching machine comprising a nailing die having driver passages, mechanism for positioning upon the nailing die at a heel attaching station a heel which is to be attached to the shoe, nail drivers movable in said passages, a jack movable between the transfer station, where it is adapted supportingly to receive the pallet and the shoe mounted on said pallet, and the heel attaching station, means for moving the jack and the pallet mounted on it in one direction from the transfer station to the heel attaching station, means responsive to movement of the pallet to the heel attaching station for moving at the heel attaching station the jack in a second direction to cause a heel seat of the shoe on said pallet to be forced against the heel, and means for moving the drivers in the passages of the nailing die to drive nails in said passages into the heel and the heel seat of the shoe whereby to attach the heel to the shoe, said second-named means also being responsive to movement of the drivers to move the jack in a direction opposite to said second direction whereby to move at said heel attaching station the pallet and accordingly the shoe and its attached heel away from the nailing die and the heel positioning means, and said first-named means being responsive to movement of the jack and accordingly the pallet, the shoe and its attached heel in a direction opposite to said second direction to move the jack and accordingly the pallet and the shoe in a direction opposite to said one direction back to the transfer station for delivery back to the conveyor.

16. A heel attaching machine for use with a conveyor which has a transfer station and is adapted successively to deliver to the transfer station pallets having shoes mounted on them, said heel attaching machine comprising a nailing die positioned at a heel attaching station and having driver passages, means for positioning on the nailing die a heel which is to be attached to the shoe, nail drivers movable in said passages, a jack movable between the transfer and the heel attaching stations, means for positioning on the jack at the transfer station one of said pallets and accordingly a shoe carried thereby, means for securing the pallet to and for releasing it from said jack as the jack leaves and arrives respectively at the transfer station, fluid pressure means for moving the jack and the pallet secured to it in one direction to the heel attaching station, fluid pressure means responsive to movement of the jack and accordingly the pallet to the heel attaching station for moving the jack in the heel attaching station in a second direction to cause a heel seat of the shoe mounted on the jack to be forced against the heel on the nailing die, and fluid pressure means for causing the drivers to drive nails into the heel and the heel seat of the shoe whereby to attach the heel to the shoe, said second-named fluid pressure means being responsive to movement of the drivers to move the jack in a direction opposite to said second direction whereby to move the jack, the pallet and accordingly the shoe and the heel mounted on the pallet in the heel attaching station away from the nailing die, and said first-named fluid pressure means being responsive to movement of the jack and accordingly the pallet and the shoe mounted on it away from the nailing die for moving the jack, the pallet and the shoe in a direction opposite to said one direction back to the transfer station.

17. The combination of a heel attaching machine, which has a heel attaching station, and a conveyor, which has a transfer station, comprising a guide beam, pallets which are adapted to support lasts having shoes mounted on them and which are movable successively along the conveyor, an impeller adapted to move pallets along the conveyor, means for continuously operating said impeller, a jack movable on the guide beam between said heel attaching and transfer stations, a nailing die having passages, a form for positioning a heel with relation to the nailing die, a back gage mounted on the guide beam, mechanism for releasing at the transfer station the pallets from the impeller and for centralizing said pallets on the jack waiting at the transfer station, power operated means for delivering nails to the passages of the nailing die, fluid pressure means responsive to the action of said pallet releasing and centralizing mechanism for moving the jack on the guide beam from the transfer station to the heel attaching station and thus to cause the shoe supported by the jack to engage the back gage and to be positioned lengthwise on the guide beam at the heel attaching station, fluid pressure means responsive to the engagement of the shoe with the back gage for moving at the heel attaching station the guide beam together with the jack as a unit toward the nailing die and thus to cause the shoe to be forced against the heel positioned by said form, fluid pressure means for driving nails delivered to the passages of the mailing die into the heel and the heel seat of the shoe to attach the heel to the shoe, said second- and first-named fluid pressure means being adapted to move the jack together with the pallet and the shoe supported by it back to the transfer station, means for releasing the pallet from the jack and for causing the pallet to be moved by said impeller out of the transfer station and along the conveyor, and means responsive to movement of the pallet away from its transfer station for rendering said nail delivering means active to supply nails to the passages of the nailing die.

18. In a combined heel attaching machine and conveyor, guide rails, pallets which are movable along the rails and are adapted to support lasts having shoes mounted on them, an impeller for moving the pallets along the rails, a nailing die which has passages and is positioned at a heel attaching station, means for positioning a heel with relation to the nailing die, a jack adapted successively to receive the pallets, as they move along said rails, at a transfer station and also adapted to have pallets removed from it at the transfer station for delivery back to the rails, fluid pressure means for moving the jack with a pallet mounted on it between the transfer and the heel attaching stations, means for releasing pallets which have shoes mounted on them from the impeller and positioning them on the jack at the transfer station, a transfer valve for controlling operation of said fluid pressure means, means for securing the positioned pallet on the jack, nail drivers movable in the nail passages of the nailing die, fluid pressure means for operating the drivers, fluid pressure means for moving at the heel attaching station the jack, the pallet and the shoe mounted on it toward and away from the nailing die, a main valve for controlling operation of the second and third-named fluid pressure means, means responsive to movement along said rails to the transfer station of pallets supporting shoes for effecting one setting of the transfer valve whereby to cause said first-named fluid pressure means to move the jack and the pallet with the shoe mounted on it to the heel attaching station, means responsive to movement of the jack, the pallet and the shoe mounted on the pallet to the heel attaching station for effecting one setting of said main valve whereby to render the third-named fluid pressure means effective to cause at the heel attaching station the jack, the pallet and the work mounted on the pallet to be moved toward the nailing die to cause the heel seat of the shoe to be forced against the heel and also to render said second-named fluid pressure means effective to cause the drivers to drive nails in the passages of the nailing die into the heel and the heel seat of the shoe, means responsive to driving movement of the drivers for effecting a second setting of the main valve to render said third-named fluid pressure means effective to cause the jack, the pallet and the shoe together with its attached heel to be moved at the heel attaching station away from the nailing die and to cause said second-named fluid pressure means to be effective to move the drivers to their starting positions in the nailing die, means responsive to movement of the jack, the pallet and the shoe away from the nailing die for effecting a second setting of the transfer valve whereby to cause the first-named fluid pressure means to move the jack, the pallet and the shoe from the heel attaching station to the transfer station, and means responsive to movement of the jack, the pallet and the shoe to the transfer station for releasing the pallet from the jack to allow the impeller to move the pallet and the shoe out of the transfer station and along the rails.

19. In a combined heel attaching machine and conveyer, a nailing die having passages, means for positioning and supporting a heel adjacent to the nailing die at a heel attaching station, a guide beam which has a guideway and is movable toward and away from the nailing die in a rectilinear path disposed at right angles to said guideway, a back gage carried by the guide beam, a jack movable in the guideway of the guide beam between the heel attaching station and a transfer station spaced a substantial distance from the heel attaching station, rails which extend to and away from the transfer station, pallets which are adapted to support lasts upon which shoes are mounted and to travel successively along said rails, a continuously moved impeller for driving pallets along said rails, means responsive to movement of one of the pallets, which carries a last having a shoe mounted on it, along the conveyor for disconnecting the pallet from the impeller when the pallet has moved onto the jack waiting at the transfer station and for centralizing said pallet on the jack, means for moving the jack and accordingly the pallet, the last and the shoe on the last as a unit from the transfer station toward the heel attaching station until the rear end of the shoe engages the back gage and thus positions the shoe lengthwise at the heel attaching station on the guide beam, means for securing the pallet and accordingly the last and the shoe to the jack as the jack leaves the transfer station, nail drivers movable in the passages of the nailing die, means responsive to engagement of the rear end of the shoe mounted on the jack with the back gage for moving the guide beam and the jack as a unit toward the nailing die to force the heel seat of the shoe against the heel, means for operating the drivers to drive nails into the heel and the heel seat of the shoe whereby to attach the heel to the shoe, said fifth-named means being responsive to movement of the drivers and being adapted to move the guide beam and the jack as a unit and accordingly the pallet, the last and the shoe on the jack away from the nailing die, said third-named means being responsive to movement of the guide beam and the jack away from the nailing die and being adapted to move said jack and accordingly the pallet, the last and the shoe mounted on it along the guideway of the guide beam from the heel attaching station to the transfer station and accordingly back to the rails, and means for releasing the pallet from the jack as the jack arrives at the transfer station thereby enabling the impeller to move the pallet and the work on it along said rails out of the transfer station.

20. In a combined heel attaching machine and conveyor, guide rails, pallets which are movable along said rails and are adapted to support lasts having shoes mounted on them, an impeller for moving the pallets along the rails, a nailing die which has passages and is positioned at a heel attaching station, means for positioning a heel with relation to the nailing die, a jack adapted successively to receive the pallet, as they are moved along the rails at a transfer station, and also adapted to have the pallets removed from them at said station for delivery back to the rails, fluid pressure means for moving the jack with the pallet mounted on it between the transfer station and the heel attaching station, means for releasing pallets which have shoes mounted on them from the impeller and for positioning them on the jack at the transfer station, a transfer valve for controlling operation of said fluid pressure means, means for securing the positioned pallet on the jack, nail drivers movable in the nail passages of the nailing die, fluid pressure means for operating the drivers, fluid pressure means for moving at the heel attaching station the jack, the pallet and the shoe mounted on it toward and away from the nailing die, a main valve for effecting operation of the third-named fluid pressure means, means responsive to movement along said rails to the transfer station of the pallets supporting shoes for effecting one setting of the transfer valve whereby to cause said first-named fluid pressure means to move the jack and the pallet with a shoe mounted on it to the heel attaching station, means responsive to movement of the jack, the pallet and the shoe mounted on the pallet to the heel attaching station for effecting one setting of said main valve whereby to render the third-named fluid pressure means effective to cause at the heel attaching station the jack, the pallet and the work mounted on the pallet to be moved toward the nailing die to cause the heel seat of the shoe to be forced against the heel and also to render said second-named fluid pressure means effective to cause the drivers to drive nails in the passages of the nailing die into the heel and the heel seat of the shoe, means responsive to driving movement of the drivers for effecting a second setting of the main valve to render said third-named fluid pressure means effective to cause the jack, the pallet and the shoe together with its attached heel to be moved in the heel attaching station away from the nailing die and to render said second-named fluid pressure means to be effective to move the drivers to their starting positions in the nailing die, means responsive to movement of the jack, the pallet and the shoe away from the nailing die for effecting a second setting of the transfer valve whereby to cause the first-named fluid pressure means to move the jack, the pallet and the shoe from the heel attaching station to the transfer station, and means responsive to movement of the jack, the pallet and the shoe to the transfer station for releasing the pallet from the jack to allow the impeller to move the pallet and the shoe out of the transfer station and along the conveyor.

21. In a combined heel attaching machine and conveyor, a nailing die having passages, means for positioning and supporting a heel adjacent to the nailing die at a heel attaching station, a guide beam which has a guideway and is movable toward and away from the nailing die and the heel in a rectilinear path disposed at right angles to said guideway, a back gage carried by the guide beam, a jack movable in the guideway of the guide beam between the heel attaching station and a transfer station spaced a substantial distance from the heel attaching station, rails which extend through the transfer station, pallets which are adapted to support lasts upon which shoes are mounted and to travel successively along the rails, a continuously moved impeller for driving the pallets along said rails, means responsive to movement of one of the pallets which carries a last having a shoe mounted on it along the conveyor for disconnecting the pallet from the impeller when the pallet has moved onto the jack waiting at the transfer station and for centralizing said pallet on the jack, means for moving the jack and accordingly the pallet and the shoe on the last as a unit from the transfer station toward the heel attaching station until the rear end of the shoe engages the back gage and thus positions the shoe lengthwise at the heel attaching station on the guide beam, means for securing the pallet and accordingly the last and the shoe to the jack as the jack leaves the transfer station, nail drivers movable in the passages of the nailing die, means responsive to engagement of the rear end of the shoe mounted on the gage with the back gage for moving the guide beam and the jack as a unit toward the nailing die to force the heel seat of the shoe against the heel, means for operating the drivers to drive nails into the heel and the heel seat of the shoe whereby to attach the heel to the shoe, said fifth-named means being responsive to movement of the drivers and being adapted to move the guide beam and the jack as a unit and accordingly the pallet, the last and the shoe on the last away from the nailing die, said third-named means being responsive to movement of the guide beam and the jack away from the nailing die and being adapted to move said jack and accordingly the pallet, the last and the shoe mounted on it along the guideway of the guide beam from the heel attaching station to the transfer station and accordingly back to the rails, and means for releasing the pallet from the jack as the jack arrives at the transfer station thereby enabling the impeller to move the pallet and the work on it along said rails out of the transfer station and along the conveyor.

22. A conveyor for use with a heel attaching machine which has a jack movable between a transfer station at the conveyor and the machine and a heel attaching station at the machine and which has nail loading mechanism, said conveyor comprising holders which are movable successively along the conveyor and each of which may or may not have mounted on it a last bearing a partially built shoe, means adapted automatically to transfer the holders to the jack in a waiting position at the transfer station when the holders have lasts respectively mounted on them and adapted to allow the holders to pass uninterruptedly past the jack and along the conveyor when no lasts and accordingly no partially built shoes are mounted on the holders.

23. A conveyor having a transfer station and adapted for use with a shoe machine which has a heel attaching station, a jack, fastening inserting means, mechanism for supplying fastenings to said fastening inserting means and means for moving the jack between said transfer and heel attaching stations, said conveyor comprising an impeller for moving a plurality of holders with and without work on them along the conveyor, means for successively transferring the holders with work on them to the jack at the transfer station preparatory to moving the jack, the holder and the work on said holder to the heel attaching station where fastenings are inserted into the work and back to the transfer station, means for causing the holder and the work on it to be transferred from the jack, which has been returned to the transfer station, back to the conveyor for movement away from the transfer station, and means responsive to movement of the holder with work on it along the conveyor away from the transfer station for operating the fastening supplying mechanism.

24. A conveyor for use with a heel attaching machine which has a jack movable between a transfer station at the conveyor and the machine and a heel attaching station at the machine, said conveyor comprising holders each of which may or may not have mounted on it a last bearing a partially built shoe, means for moving the holders successively along the conveyor, and mechanism for disconnecting the holders, which are moving along the conveyor, from said means and for transferring them to a position upon the jack at the transfer station if the holders have lasts respectively mounted on them, said mechanism being adapted to cause the holders moved along the conveyor by said first-named means to move uninterruptedly past the jack and along the conveyor when no lasts are mounted on said holders.

25. A conveyor for use with a heel attaching machine which has nail loading mechanism and a jack movable between a transfer station of the conveyor and a heel attaching station of the machine, said conveyor comprising holders which are movable successively along the conveyor and have mounted on them lasts bearing partially built shoes respectively, an impeller for moving the holders along the conveyor, means adapted automatically to transfer said holders successively to the jack at the transfer station and, after the jack with the holder on it has been moved to the heel attaching station and back to the transfer station, to transfer the holder from the jack back to the conveyor for movement along the conveyor from said transfer station, and means responsive to movement of the holder along the conveyor from the transfer station for operating the nail loading mechanism.

26. A conveyor for use with a heel attaching machine which has a jack movable between a heel attaching station and a transfer station, a nailing die, and a loader block for delivering nails to said die, said conveyor comprising a driver adapted to move respectively pallets with and without work on them to and past said transfer station, mechanism for successively releasing from the driver and transferring from the conveyor to the jack waiting at the transfer station leading pallets with work on them and, after said pallets have been moved to the heel attaching station and back to the transfer station, to cause said pallets to be coupled to the driver and to be removed from the jack for movement along the conveyor away from the transfer station, and means responsive to movement of said pallets away from the transfer station for operating the loader block to cause nails to be delivered to the nailing die.

27. A conveyor for use with a heel attaching machine which has a jack movable between a heel attaching station and a transfer station, a nailing die, and a loader block for delivering nails to said die, said conveyor comprising rails, an impeller for moving pallets with or without work mounted on them along the rails, mechanism for successively releasing from the impeller and transferring to the jack waiting at the transfer station leading pallets with work mounted on them as said pallets are moved along the rails by the impeller and for allowing leading pallets without work on them and moved along the rails by the impeller to continue their movement along and past the jack at the transfer station, means for successively releasing pallets, which have work mounted on them and have been moved to and from the heel attaching station, from the jack as they arrive at the transfer station and for coupling them to the impeller for movement along the conveyor and away from said transfer station, and means responsive to movement of the pallets with work on them away from the transfer station and along the conveyor for operating the loader block whereby to cause nails to be delivered to the nailing die, said last-named means being nonresponsive to movement of the pallets without work on them as they move along the conveyor away from the transfer station.

28. A conveyor for use with a heel attaching machine which has a jack movable between a heel attaching station and a transfer station, a nailing die, and a loader block for delivering nails to said die, said conveyor comprising a driver adapted to move pallets with or without work mounted on them in succession from a waiting position at a holdback station to the transfer station, mechanism for successively releasing from the driver and transferring to the jack waiting at the transfer station leading pallets with work mounted on them and, after said pallets have been moved to the heel attaching station and back to the transfer station, to cause the pallets to be coupled to the driver and removed from the jack for movement along said conveyor away from said transfer station, mechanism for causing pallets without work mounted on them to move continuously along the conveyor from the holdback station along the jack and past the transfer station, means responsive to movement of pallets, which have work mounted on them, away from the transfer station for operating the loader block to cause nails to be delivered to the nailing die, and means for insuring against pallets without work mounted on them operating said last-named means.

29. A conveyor having a transfer station and adapted for use with a fastening-inserting machine which comprises a support for receiving one work piece, means for moving a holder and a second work piece on a form mounted on the holder from the transfer station to a fastening-inserting station of the machine and back to the transfer station, means for moving the holder at the fastening-inserting station toward the support to force said second work piece against the first work piece mounted on the support, means for inserting fastenings into the clamped together work pieces at the fastening-inserting station to attach them to each other and mechanism for supplying fastenings to the fastening-inserting means, said conveyor comprising a driver for successively moving to the transfer station a plurality of said holders with or without forms and accordingly said second work pieces mounted on them, means for disconnecting from the driver each of the holders, which has a form and accordingly said second work piece mounted on it, as the holder arrives at the transfer station preparatory to being moved to the fastening-inserting station and back to the transfer station, means for causing the holder moved to the transfer station from the fastening-inserting station to be connected to the driver whereby to cause the holder and accordingly the form and the secured together work pieces to be moved from the transfer station and along the conveyor, and means responsive to movement of the holder away from the transfer station and along the conveyor for operating said mechanism to deliver fastenings to said fastening-inserting means.

30. A conveyor for use with a machine which is adapted to attach two shoe parts together and which has an attaching station and a jack, said conveyor having a transfer station between which and said attaching station the jack is moved and comprising an impeller, pallets adapted to support forms having shoe parts respectively mounted on them, rails along which the pallets are successively moved by said impeller to the transfer station and which are adapted to guide the pallets onto the jack at the transfer station, mechanism for disconnecting the pallets from the impeller and for centralizing them on the jack at the transfer station, work sensing means which is mounted on each of the pallets and is moved between active and inactive positions on the pallet in accordance with whether or not one of said forms and accordingly one or more of said shoe parts are mounted on the pallet, and means which is responsive to engagement by said work sensing means in its active position on the pallet as the pallet arrives at the transfer station and is mounted on the jack for rendering said disconnecting and centralizing mechanism effective to cause the pallet, the form and the shoe part on said form to be disconnected from the impeller and to be mounted in a fixed position on the jack preparatory to moving the jack between the transfer and the attaching stations, said last-named means being nonresponsive to said work sensing means in its inactive position on the pallet thereby allowing a pallet moved along the conveyor by the impeller and not having one of said forms mounted on it to be moved continuously past the jack at the transfer station and accordingly through this station without being transferred to the machine.

31. A conveyor for use with a heel attaching machine which has a heel attaching station and a jack, said conveyor having a transfer station between which and the heel attaching station said jack is moved and comprising an impeller, pallets for supporting lasts having shoes mounted on them, rails along which the pallets are successively moved by the impeller to the transfer station and which are adapted to guide the pallets onto the jack waiting at the transfer station, mechanism for disconnecting the pallets from the impeller and for positioning said pallets on the jack at the transfer station, a spring-pressed sensing rod which is mounted on each of the pallets and is movable between active and inactive positions on its associated pallet in accordance with whether or not a last is mounted on the pallet, and means which is responsive to engagement by said sensing rod in its active position on the pallet as said pallet arrives at the transfer station for rendering said disconnecting and centralizing mechanism effective to cause the pallet and the last mounted on it to be positioned on the jack preparatory to moving the jack between the transfer and the heel attaching stations, said last-named means being nonresponsive to said sensing rod in its inactive position on the pallet as the pallet arrives at the transfer station thereby allowing a pallet which has no last on it and is operated by the impeller to be moved continuously past the jack at said transfer station and accordingly through this station by the impeller without being transferred to the jack and accordingly to and from the heel attaching station.

32. A conveyor which is adapted for use with a shoe machine having a jack and which has a transfer station for receiving the jack and has a holdback station and which comprises work holders each providing with a sensing member adapted to assume an active position on the associated holder when work is mounted on the holder and adapted to assume an inactive position on the holder when there is no work on said holder, an impeller for moving the holders along the conveyor, means movable to an effective position in which it causes the holders to be disconnected from the impeller as they arrive successively at the holdback station and retains them temporarily disconnected from said impeller at this station, manually actuated power operated mechanism for moving said means from an effective position to an ineffective position to cause a leading holder at said holdback station to be released for movement along the conveyor to the transfer station by the impeller, means which is responsive to movement to the transfer station of the sensing member in an active position on the holder for disconnecting the holder from the impeller and positioning it on the jack waiting at the transfer station and which is adapted to allow the holder, when the sensing member is in its inactive position on the holder, to move uninterruptedly past the jack at the transfer station and along the conveyor, and means responsive to movement of the sensing member in its active position on the holder as it enters the transfer station for rendering the manually actuated power operated means ineffective to release a following holder at the holdback station until the leading holder has moved out of the transfer station along the conveyor.

33. A conveyor for use with a heel attaching machine which has a jack, means for moving the jack between a transfer station of the conveyor and a heel attaching station of the machine, and nail loading mechanism, said conveyor comprising holders which are movable in succession along the conveyor and which may or may not have mounted on them lasts respectively bearing partially built shoes, an impeller for moving the holders along the conveyor, means adapted automatically to transfer the holders moving along the conveyor to the jack at the transfer station, if the holders have lasts mounted on them, means for transferring the holders from the jack at the transfer station, after they have been returned from the machine, for movement away from the transfer station and along the conveyor by the impeller, means for allowing the holders to move uninterruptedly past the jack and along the conveyor if the holders do not have lasts mounted on them, means responsive to movement of the holders with lasts mounted on them away from the transfer station and along the conveyor for operating the nail loading mechanism of the heel attaching machine, and means for insuring that, when the holders which do not have lasts mounted on them are moved along the conveyor and away from the transfer station, the nail loading mechanism shall not be operated.

34. A conveyor for use with a heel attaching machine which has a jack movable between a transfer station of the conveyor and a heel attaching station of the machine and which has nail loading mechanism, said conveyor comprising an impeller, a holder which is movable along the conveyor by the impeller and may or may not have mounted on it a last carrying a partially built shoe, means which is adapted automatically to transfer the holder to the jack then in a waiting position at the transfer station, when said holder has a last mounted on it, preparatory to causing the jack to be transferred to the heel attaching station and back to said transfer station, means for causing the holder, which has a last mounted on it and is delivered back to the transfer station, to be released for movement by the action of the impeller out of the transfer station and along the conveyor, said first-named means also being adapted to allow the holder to pass uninterruptedly past the jack and along the conveyor when there is not a last on the holder, means responsive to movement of the holder with a last mounted on it away from the transfer station and along the conveyor for operating the nail loading mechanism of the heel attaching machine, and means for insuring against actuation of said nail loading mechanism by the holder, which does not have a last on it, as this holder moves away from the transfer station along the conveyor.

35. A conveyor having a transfer station and adapted for use with a heel attaching machine which comprises a support, means for moving a holder for a last having a shoe mounted on it between the transfer station and a heel attaching station of the machine, means for clamping together at the heel attaching station, a heel upon the support and the heel seat of a shoe on the last mounted on the holder, means for driving fastenings into the clamped together heel and heel seat of the shoe to attach the heel to the shoe, and mechanism for delivering fastenings to the fastening driving means, said conveyor comprising an impeller for successively moving holders with or without lasts and accordingly shoes mounted on them to the transfer station, means for disconnecting the holders having lasts and accordingly shoes mounted on them from the impeller as they arrive at the transfer station preparatory to moving said holders to the heel attaching station and back to the transfer station, means for causing each of the holders moved from the heel attaching station to the transfer station to be connected to the impeller whereby to move the holder and accordingly the last and the shoe on it from the transfer station and along the conveyor, and means responsive to movement of said holder away from the transfer station and along the conveyor for operating said mechanism to cause fastenings to be delivered to said fastening-inserting means.

36. A conveyor for use with a heel attaching machine which has a jack movable between a transfer station at the conveyor and a heel attaching station at the machine and which has a nail loader and nail driving means comprising a nailing die, said conveyor comprising tracks adapted to guide, to and from a holdback station of the conveyor and to and from the transfer station, holders upon which lasts inserted in shoes are mounted, an impeller for moving the holders along the tracks, mechanism which is movable between an active poistion, in which it is adapted to cause the holder to be disconnected from the impeller at the holdback station, and an inactive position, in which it is adapted to cause the holder to be connected at the holdback station for movement with the impeller, manually controlled power actuated means for moving said mechanism to an inactive position to cause a holder at the holdback station to be connected to the impeller and thus to cause the holder to be moved by said impeller to the transfer station, means responsive to movement of the holder out of the holdback station for moving said mechanism to its active position to cause said mechanism to disconnect from the impeller a following holder moving along the conveyor as said holder arrives at the holdback station, means for causing the holders with lasts and accordingly shoes mounted on them to be successively loaded onto the jack and after traveling through the heel attaching machine to have a heel attached to the shoe, to be released from the jack, means for causing the released holder at the transfer station to be connected to the impeller, and means responsive to movement of the holder along the conveyor from the transfer station for effecting operation of the nail loader to cause nails to be supplied to the nailing die of the heel attaching machine and for resetting said first-named mechanism thereby rendering said mechanism operable to release for movement to the transfer station a following holder at the holdback station in response to movement of said manually controlled power actuated means.

37. A conveyor having a transfer station and adapted for use with a fastening inserting machine which comprises a jack movable between the transfer station and a fastening inserting station of the machine where two shoe parts, one of which is mounted on a form carried by a pallet provided with sensing mechanism and mounted on the jack, are secured together by fastening inserting mechanism to which fastenings are delivered by fastening loading mechanism, said conveyor having a holdback station and comprising a driver, means for continuously moving the driver in a fixed path, means for successively disconnecting the pallets from the driver at the holdback station and for retaining them at the holdback station, manually initiated power operated means for causing a leading pallet at the holdback station to be released and to be connected to the driver for movement along the conveyor to the transfer station, means responsive to movement of the pallet, the sensing mechanism of which has been displaced by an associated form to an active position on the pallet, for causing said pallet to be disconnected from the driver and to be positioned on the jack at the transfer station from which said jack is moved to said fastening inserting station of the machine preparatory to securing the two parts of the shoe together by fastenings and is then returned to the transfer station, means for releasing the pallet from the jack and for coupling said pallet to the driver when the pallet from the heel attaching station arrives at the transfer station whereby to cause said pallet to move from the jack and away from the transfer station along the conveyor, safety means operative to an active position in response to movement of a pallet with a form on it to the transfer station for rendering said power operated means ineffective to release a following pallet at the holdback station, means responsive to movement of the leading pallet along the conveyor away from the transfer station for rendering said safety means inactive thereby causing said power actuated means to be rendered active in response to said manually initiated power operated means to cause the following pallet at the holdback station to be released.

38. A conveyor which has a transfer station and is adapted for use with a machine having an operating station where a plurality of pieces of work are secured together, and transfer means for moving a holder which has one or more of said pieces of work mounted on it between said transfer and operating stations, said conveyor having a holdback station and comprising an impeller for moving the holder along the conveyor, a holdback lever movable between an active position in which it stops a leading holder at the holdback station and an inactive position in which it releases the leading holder at the holdback station and thus allows this holder to be coupled to the impeller for movement along the conveyor out of this station, actuating means for moving the holdback lever from its active position to its inactive position, means comprising a reset lever which is operative in response to movement of the holder as it leaves the holdback station for causing the holdback lever to assume its active position whereby to stop at the holdback station a holder following said released holder, means for causing the released holder, if no work piece is mounted on it, automatically to pass through the transfer station and along the conveyor and for causing said released holder, if a work piece is mounted on it, automatically to be released from the impeller at the transfer station preparatory to being moved by said transfer means to said operating station and back to the transfer station, means for causing the impeller to move the holder along the conveyor after said holder has been moved back to the transfer station by said transfer means, means for rendering said actuating means inoperative until said leading holder with a work piece on it has moved along the conveyor out of the transfer station thus insuring that the following holder stopped at the holdback station cannot advance along the conveyor out of the holdback station until the leading holder has moved along the conveyor out of the transfer station, and means for allowing said actuating means to be operated and accordingly said following holder to be released at the holdback station as soon as a leading holder without a work piece on it has moved past the reset lever and accordingly before this leading holder has reached the transfer station.

39. A conveyor for use with a machine which is adapted to attach two shoe parts together and which has an attaching station and a jack, said conveyor having a holdback station and also having a transfer station between which and said attaching station the jack is moved and comprising an impeller, pallets adapted to support forms having shoe parts respectively mounted on them, rails along which the pallets are successively moved by said impeller from the holdback station to the transfer station and which are adapted to guide the pallets onto the jack at the transfer station, holdback mechanism movable to an active position for disconnecting the pallets from the impeller at the holdback station and for retaining them at the holdback station, manually initiated power control means for moving the holdback mechanism from its active position to an inactive position to release a leading pallet from the holdback station and to enable it to be coupled to the impeller for movement along the rails, reset means responsive to movement of the pallet along the rails away from the holdback station for causing the holdback mechanism to return to its active position, work sensing means which is mounted on each of the pallets and is moved between effective and ineffective positions on the pallet in accordance with whether or not one of the forms and accordingly one or more of the shoe parts is mounted on the pallet, transfer means responsive to engagement by the work sensing means of the leading pallet in its effective position as the pallet arrives at the transfer station for rendering said disconnecting and centralizing mechanism effective to cause the pallet and the shoe parts on said pallet to be disconnected from the impeller and thus to be centralized on the jack preparatory to moving the jack, the pallet and the shoe part thereon to the attaching station and back to the transfer station, said transfer means being nonresponsive to said work sensing means in its ineffective position thereby allowing a pallet moved along the conveyor by the impeller and not having one of the forms mounted on it to be moved on the rails by the impeller continuously past the jack at the transfer station and accordingly through this station without being transferred to the jack for movement toward and away from the machine, safety means responsive to the movement of the sensing means of said leading pallet in its effective position for temporarily rendering the manually initiated power controlled means inoperative, and means responsive to movement of the pallet, the sensing means of which is in its effective position, away from the transfer station for rendering said safety means ineffective and thus allowing operation of said manually initiated power controlled means to cause the following pallet to be released from the holdback station, said safety means being nonresponsive to movement along the rails of the pallet the sensing means of which is in its ineffective position, thereby insuring that the following pallet may be released from the holdback station as soon as said reset mechanism has been operated.

40. A conveyor having a transfer station and adapted for use with a fastening-inserting machine which comprises a jack movable between the transfer station and a fastening inserting station of the machine where two shoe parts one of which is mounted on a form carried by a pallet provided with sensing mechanism and mounted on the jack, are secured together by fastening-inserting mechanism to which fastenings are delivered by fastening loading mechanism, said conveyor having a holdback station and comprising a driver, means for continuously moving the driver in a fixed path, means for successively disconnecting the pallets from the driver at the holdback station and for retaining them at the holdback station, manually initiated power operated means for causing a leading pallet at the holdback station to be released and to be connected to the driver for movement along the conveyor to the transfer station, means responsive to movement of the pallet, the sensing mechanism of which has been displaced by an associated form to an active position on the pallet, for causing said pallet to be disconnected from the driver and to be positioned on the jack at the transfer station from which said jack is moved to said fastening-inserting station of the machine preparatory to securing the two parts of the shoe together by fastenings and is then returned to the transfer station, means for releasing the pallet from the jack and for coupling said pallet to the driver when the pallet from the heel attaching station arrives at the transfer station whereby to cause said pallet to move from the jack and away from the transfer station along the conveyor, safety means operative to an active position in response to movement of a pallet with a form on it to the transfer station for rendering said power operated means ineffective to release a following pallet at the holdback station, means responsive to movement of the leading pallet along the conveyor away from the transfer station for actuating the loading mechanism of the machine to cause delivery of fastenings to the fastening-inserting mechanism, and means responsive to movement of the leading pallet along the conveyor away from the transfer station for rendering said safety means inactive thereby causing said power operated means to be rendered active in response to manual initiation to cause the following pallet at the holdback station to be released.

41. The combination of a conveyor for successively delivering shoes on lasts to a transfer station and a machine for attaching heels to the shoes at a heel attaching station, comprising a nailing die having passages, means for positioning a heel with relation to the nailing die, pallets whch are movable along the conveyor and are adapted to support respectively lasts upon which the shoes are mounted, a jack adapted successively to have the pallets mounted on it and removed from it at the transfer station, fluid pressure means for moving the jack with a pallet, which bears a last and a shoe, mounted on said jack between the transfer and the heel attaching stations, means comprising an impeller for delivering a pallet, which bears a last and a shoe, to and positioning it on the jack at the transfer station, a transfer valve for controlling operation of said fluid pressure means, means for securing the positioned pallet on the jack, nail drivers movable in the passages of the nailing die, fluid pressure means for operating the nail drivers, fluid pressure means for moving at the heel attaching station the jack toward and away from the nailing die, a main valve for effecting operation of said third-named fluid pressure means, means responsive to movement along the conveyor to the transfer station of pallets, which bear lasts and shoes, for effecting one setting of the transfer valve whereby to cause the first-named fluid pressure means to move the jack and the pallet, which bears the last and the shoe, to the heel attaching station, means responsive to movement of the jack, the pallet and work on it to the heel attaching station for effecting one setting of said main valve whereby to render the third-named fluid pressure means effective to cause at the heel attaching station the jack and accordingly the pallet to be moved toward the nailing die to cause the heel seat of the shoe to be forced against the heel and also to render said second-named fluid pressure means effective to cause said drivers to drive nails in the passages of the nailing die into the heel and the heel seat of the shoe to attach the heel to the shoe, means responsive to nail driving movement of the drivers for effecting a second setting of the main valve to render said third-named fluid pressure means effective to cause said jack, the pallet and work on it to be moved at the heel attaching station away from the nailing die and also to render said second-named fluid pressure means effective to cause the drivers to be moved to retracted positions in the nailing die, means responsive to movement of the jack, the pallet and the work mounted on it away from the nailing die for effecting a second setting of the transfer valve to cause the first-named fluid pressure means to move the jack, the pallet and the work mounted on it from the heel attaching station to the transfer station and means for releasing the pallet from the jack at the transfer station to allow the impeller to move the pallet off the jack and along the conveyor away from the transfer station.

42. A heel attaching machine having a jack and adapted for use with a conveyor which has a transfer station and a driver adapted to move successively to the transfer station, holders each of which supports a last having a shoe mounted upon it, and means for centralizing the holders on the jack, said heel attaching machine having a heel attaching station, a guide beam, means for moving the jack on the guide beam between the transfer station and the heel attaching station, a stop carried by the guide beam, said jack being adapted successively to receive holders moved to the transfer station and centralized by said holder centralizing means, and a spring-pressed clamp which is carried by the jack and is adapted to secure the holder to the jack as the jack moves toward the heel attaching station and which is adapted to engage said stop as said jack arrives at the transfer station whereby to release the holder from the jack.

43. In a heel attaching machine for use with a conveyor which has a pair of guide rails and an impeller for successively delivering pallets along the rails to a transfer station and which has a gap in one of the rails at the transfer station, said heel attaching machine having a heel attaching station and comprising a jack which is adapted successively to receive the pallets at the transfer station and has a rail section, and means for moving the jack between the transfer station and the heel attaching station, said rail section of the jack, when the jack is at the transfer station being adapted to bridge the gap in said rail of the conveyor and to cooperate with an opposite portion of the other guide rail of the conveyor to guide the pallet past the transfer station.

44. A heel attaching machine for use with a conveyor which is adapted successively to deliver pallets, which are adapted to support lasts having shoes mounted on them, to and from a transfer station at the conveyor, said heel attaching machine comprising a support arranged at a heel attaching station for receiving a heel, a transfer unit adapted successively to receive said pallets from the conveyor at the transfer station and to move said pallets successively to the heel attaching station and then back to the transfer station for movement along the conveyor away from said transfer station, means for successively forcing at the heel attaching station the heel seats of shoes delivered by the holder against the heels mounted on said support, means for driving nails into the heels and the heel seats of the shoes thus forced together, mechanism for feeding nails to the nail driving means, and means responsive to movement of the pallet on the conveyor away from the transfer station for effecting operation of said nail feeding mechanism.

45. A heel attaching machine for use with a conveyor which has a pair of guide rails and an impeller for successively delivering pallets along said rails from a holdback station to a transfer station and which has a gap in one of its rails at the transfer station, said heel attaching machine comprising a support for a heel arranged at a heel attaching station, a jack adapted successively to receive pallets at the transfer station, a rail section secured to the jack, nail driving means arranged at the heel attaching station, means for moving the jack between the heel attaching station and the transfer station, means for forcing together at the heel attaching station the heel and a heel seat of a shoe mounted on one of the pallets supported by the jack, and means for operating the nail driving means to attach the heel to the shoe, said rail section of the jack, when the jack is at the transfer station, being adapted to bridge the gap in said one rail of the conveyor and to cooperate with an opposite portion of the other guide rail of the conveyor in the guiding of the pallet at the transfer station.

46. A heel attaching machine for use with a conveyor having a transfer station and an impeller which is adapted to move successively to said transfer station, holders each of which has a coupling portion and is adapted to support a last having a shoe mounted on it, said heel attaching machine comprising a nailing die adapted to be engaged by a heel at a heel attaching station, means for positioning said heel adjacent to the nailing die, a guide beam movable in a vertical path, a jack movable on the guide beam in a horizontal path, a stop secured to the guide beam, means for moving the jack on the guide beam in said horizontal path between the transfer and the heel attaching stations and for moving the jack as a unit with the guide beam in said vertical path to move the jack at the heel attaching station toward and away from the nailing die, said jack having a coupling portion adapted, when the jack is at the transfer station, to receive the coupling portion of the holder moved to the transfer station by the conveyor, and a spring-pressed clamp which is carried by the jack and which is moved from an active clamping position to an inactive position on the jack by the stop as said jack moves on the guide beam to the transfer station thereby allowing movement of the holder on the jack, said spring-pressed clamp being adapted to move to its active clamping position on the jack as said jack moves on the guide beam away from the transfer station whereby to cause the holder to be secured against movement on the jack.

47. A heel attaching machine for use with a conveyor which has an impeller and is adapted to move holders for lasts having shoes mounted on them successively to a transfer station, said heel attaching machine comprising a nailing die positioned at a heel attaching station and having passages for receiving fastenings, means for positioning a heel with relation to the die, a guide beam movable toward and away from the nailing die in one path extending generally lengthwise of said passages, a jack movable on said beam between the transfer and the heel attaching stations in a second path angularly disposed to said one path, means for moving the jack in said second path, a stop secured to the beam, said jack having a coupling portion adapted when the jack is in said transfer station to receive the holder moved by the conveyor to the transfer station, and a spring-pressed clamp which is carried by the jack and is adapted to be engaged by the stop as said jack moves into the transfer station whereby to move the clamp to an inactive position and thus to permit movement of the holder acted upon by said impeller from the coupling portion of the jack and onto the conveyor and to permit another holder moving along the conveyor to ride onto the coupling portion of the jack, said clamp being adapted to move to an active clamping position against the holder mounted on the jack in response to movement of the jack away from the transfer station whereby to secure the holder to the jack as it is moved in said second path toward the heel attaching station.

48. In a heel attaching machine, a support for a heel, a support for a shoe, fluid pressure means for effecting at a heel attaching station relative movement of approach between the supports to force together the heel and a heel seat of the shoe, fluid pressure means for inserting fastenings into the heel and the heel seat of the shoe, said first-named fluid pressure means also being adapted to effect at the heel attaching station movement of separation between the supports, and fluid pressure means for moving the shoe support between the heel attaching station and a loading and unloading station spaced from the heel attaching station.

49. In a heel attaching machine, a support for a heel, a support for a shoe, fluid pressure means for effecting at a heel attaching station relative movement of approach between the supports to force together under substantial pressure the heel and a heel seat of the shoe, power means for driving at the heel attaching station fastenings into the heel and the heel seat of the shoe whereby to attach the heel to the shoe, said fluid pressure means also being adapted to effect at the heel attaching station relative movement of separation between the supports, and fluid pressure means operated in timed relation with the aforesaid fluid pressure means for moving the shoe support between the heel attaching station and a loading and unloading station spaced from the heel attaching station.

50. In a heel attaching machine, a support for a heel, a support for a shoe, fluid pressure means for effecting at a heel attaching station relative movement of approach between the supports to force together under substantial pressure the heel and a heel seat of the shoe, power means for driving at the heel attaching station fastenings into the heel and the heel seat of the shoe whereby to attach the heel to the shoe, said fluid pressure means also being adapted to effect at the heel attaching station relative movement of separation between the supports to release the shoe and the heel attached thereto from their clamped relation between said supports, fluid pressure means operated in timed relation with the aforesaid fluid pressure means for moving the shoe support between the heel attaching station and a loading and unloading station spaced from the heel attaching station, means for powering said fluid pressure means, and means for maintaining when the machine is powered but idle the shoe support at the loading and unloading station.

51. A combined heel attaching machine and conveyor comprising means for forcing a heel and a heel seat of a shoe together at a heel attaching station, means for driving at the heel attaching station fastenings into the heel and the heel seat of the shoe, mechanism for delivering fastenings to the fastening driving means, means for delivering shoes along the conveyor to and away from a transfer station, means for delivering shoes from the transfer station to the heel attaching station and back to the transfer station, and means responsive to movement of the shoe, which has been delivered back to the transfer station and is moved along the conveyor and away from the transfer station, for operating the fastening delivering mechanism.

52. In a heel attaching machine having a heel attaching station and a loading and unloading station spaced from said heel attaching station, a fixed support positioned at said heel attaching station and adapted to receive a heel, a movable support adapted to receive a shoe at said loading and unloading sttaion, fluid pressure means comprising an actuator operatively connected to the movable support, means for rendering the fluid pressure means active to cause said actuator to move said movable support toward the fixed support at said heel attaching station whereby to force together with primary pressure between said supports the heel and a heel seat of the shoe mounted respectively on the supports, fluid pressure means operative in response to the application of primary pressure between the heel and the heel seat of the shoe and adapted to drive at the heel attaching station fastenings into the heel and the heel seat of the shoe and to apply secondary pressure between the heel and the heel seat of the shoe, means for causing said last-named means to limit the depth to which the fastenings are driven into the heel and the heel seat of the shoe and to cause said first-named means to move said movable support in said heel attaching station away from the fixed support, and fluid pressure means operative in timed relation with said aforesaid fluid pressure means for moving the movable support between said heel attaching station and said loading and unloading station.

53. In a machine for attaching two shoe parts together, a pair of supports for receiving the shoe parts respectively, fluid pressure means for effecting at an attaching station relative movement of approach between the supports to cause said shoe parts to be squeezed together with preliminary pressure, drivers for nails, fluid pressure means for moving the drivers in one of the supports to drive nails into the shoe parts whereby to secure said parts together, fluid pressure means responsive to pressure exerted by the drivers against the nails for effecting relative movement between the supports to squeeze the shoe parts together with augmented pressure, and fluid pressure means operative in timed relation with the aforesaid fluid pressure means for moving the other of said supports between said attaching station and a loading and unloading station spaced a distance from the attaching station.

54. In a fastening inserting machine having an attaching station and a loading and unloading station spaced from said heel attaching station, a nailing die having driver passages for receiving nails, fluid pressure means comprising a jack cooperating with said die at said attaching station to squeeze together between said die and said jack a pair of shoe parts with sustained preliminary pressure, nail drivers, fluid pressure means for moving said drivers along said passages to cause them to drive nails into the shoe part, fluid pressure means responsive to the force required to drive the nails into the shoe parts for causing said first-named fluid pressure means to squeeze said shoe parts with additional force substantially equal to the force required to drive the nails into said shoe parts, a valve movable between retracted and projected settings for controlling said fluid pressure means, and fluid pressure means operated in timed relation with the aforesaid fluid pressure means for automatically moving the jack between the attaching station and the loading and unloading station.

55. In a fastening-inserting machine, a movable support for receiving one of a pair of shoe parts to be secured together, a fixed support for receiving the other of said shoe parts, a first actuator operatively connected to said movable support, fluid pressure means for applying force against the first actuator to move the movable support in one direction whereby to cause the shoe parts to be clamped together with preliminary pressure between said movable and fixed supports at an attaching station, nail drivers, a second actuator operatively connected to said nail drivers, fluid pressure means for moving said second actuator and accordingly moving the drivers in a direction opposite to said one direction at the attaching station with a force sufficient to cause the drivers to drive nails into said shoe parts, fluid pressure means for applying against said first actuator a secondary force which is responsive and equal to the force applied against said second actuator whereby to apply in said one direction against the movable support an additional force equal substantially to the force required to drive nails into the work, means responsive to movement of the drivers in said opposite direction for causing the fluid pressure means to limit movement of the movable support and the drivers in said one and opposite directions respectively and to move the movable support and the drivers in directions opposite to said one and opposite directions respectively, and fluid pressure means operative in timed relation with the aforesaid fluid pressure means for moving the movable support between the attaching station and a loading and unloading station spaced from said attaching station.

56. In a heel attaching machine, a nailing die which has passages and is adapted to be engaged by a heel at a heel attaching station, means for positioning the heel on the nailing die, a clamp actuator and a guide beam each of which is freely movable positively in response to movement of the other, a jack carried by and movable on the guide beam between said heel attaching station and a loading and unloading station spaced from the heel attaching station, a driver head, nail drivers secured to the driver head and movable in the passages of the nailing die and together with the driver head toward and away from the guide beam, a driver actuator, said driver head and said driver actuator being freely movable positively in response to movement of the other, means for applying a primary force to the clamp actuator to move the guide beam and accordingly the jack on it toward the nailing die whereby to force with preliminary pressure at the heel attaching station a shoe carried by the jack against the heel supported by the nailing die, means for applying against the driver actuator a force which is sufficient to cause nails in the passages of the nailing die to be driven into the heel and the heel seat of the shoe by the drivers and which varies in accordance with the resistance offered by the heel and the heel seat of the shoe to said nails, means for applying to the clamp actuator a secondary force which augments said primary force and is substantially equal to the force applied against the driver actuator and which varies in accordance with the variations of the force applied against said driver actuator whereby to force at the heel attaching station the shoe mounted on the jack with additional pressure against the heel, and power means operative in timed relation with said fluid pressure means for moving the jack on the guide beam between the heel attaching station and the loading and unloading station.

57. In a heel attaching machine, a fixed support adapted to receive a heel at a heel attaching station, a movable support adapted to receive a shoe at a loading and unloading station which is spaced from the heel attaching station, fluid pressure means comprising an actuator operatively connected to the movable support, means for rendering said fluid pressure means active to cause said actuator to move at said heel attaching station said movable support toward the fixed support whereby to force the heel and the heel seat of a shoe mounted respectively on the supports together with primary pressure between the supports, fluid pressure means operative in response to movement of said first-named means and adapted to drive at the heel attaching station fastenings into the heel and the heel seat of the shoe and to apply secondary pressure between the heel and the heel seat of the shoe, means for causing the last-named means to limit the depth to which the fastenings are driven into the heel and the heel seat of the shoe and to cause said first-named means to move said movable support away from the fixed support, fluid pressure means operative in timed relation with said last-named means for moving the movable support between the heel attaching station and the loading and unloading station, means for powering the machine to render said aforesaid fluid pressure means active, and means for rendering said last-named fluid pressure means active to maintain the movable support at the loading and unloading station when the machine is powered but idle.

58. The combination of a heel attaching machine and a conveyor which is adapted automatically to deliver shoes to the machine and to remove the shoes to which heels have been attached from the machine, comprising means for forcing a heel and a heel seat of a shoe together at a heel attaching station, means for driving at the heel attaching station fastenings into the heel and the heel seat of the shoe whereby to attach the heel to the shoe, mechanism for delivering fastenings to the fastening driving means, pallets upon which lasts carrying shoes may be mounted and which are movable along the conveyor to and from a transfer station, a driver for moving the pallets along the conveyor, means for successively delivering the pallets, which have lasts carrying shoes mounted on them, from the transfer station to the heel attaching station and, after the heels have been attached to the shoes, back to the transfer station, means for causing pallets without lasts and accordingly shoes mounted on them to be moved continuously along the conveyor past and out of the transfer station without being moved to the heel attaching station, means responsive to movement of the pallets with lasts mounted on them out of the transfer station and along the conveyor for operating the fastening delivering mechanism, and means for insuring that the pallets, which do not have lasts mounted on them and accordingly have not been moved to and away from the heel attaching station, shall not render the fastening delivering mechanism active to deliver nails to the fastening driving means as these pallets move along the conveyor away from the transfer station.

59. In a machine for attaching two parts of a shoe together, a fixed nailing die adapted to be engaged by one of the shoe parts at a heel attaching station, means for positioning said one shoe part adjacent to said die, a jack for supporting the other shoe part, a guide beam upon which the jack is slidingly mounted, power means for moving the jack on the guide beam between the heel attaching station and a loading and unloading station spaced from the heel attaching station, fastening-inserting means movable in the nailing die, fluid pressure means comprising one actuator which is operatively connected to the guide beam and accordingly to the jack, a first cylinder forming primary and secondary chambers with the actuator, a second actuator which is operatively connected for free reversible positive movement to the fastening-inserting means, a second cylinder forming a third chamber with the second actuator, a pressure line, a valve connected to the pressure line, a branch line between the valve and said primary chamber, means responsive to one setting of said valve to render fluid in the pressure line available for the branch line and accordingly for the primary chamber thereby causing displacement of said one actuator and accordingly movement of the guide beam and accordingly the jack at the heel attaching station toward the nailing die to cause the shoe parts to be clamped together with primary pressure, a transfer line adapted at all times to connect said second and third chambers, a sequence valve responsive to build-up pressure in the branch line for opening at a predetermined pressure the transfer line to the branch line to render said first-named fastening-inserting means active to drive fastenings into the clamped shoe parts and substantially simultaneously therewith to apply augmented pressure against said one actuator whereby to apply at the heel attaching station against the guide beam and accordingly the jack in addition to the primary pressure an augmented pressure which varies in accordance with the force exerted against said second actuator in the driving of fastenings into the shoe parts.

60. In a heel attaching machine for use with a conveyor which has a transfer station and is adapted successively to deliver to said transfer station shoes which are mounted on lasts carried by pallets, said heel attaching machine comprising a nailing die which has passages and is adapted to be engaged by a heel at a head attaching station, nail drivers movable in said passages, a jack adapted successively to receive the pallets at the transfer station, means for positioning a heel adjacent to the nailing die, means for moving the jack in one direction away from the transfer station to the heel attaching station, means responsive to movement of the jack in said one direction for moving the jack at the heel attaching station in a second direction whereby to force against the heel with preliminary pressure the heel seat of the shoe carried by the pallet mounted on the jack, means for operating the nail drivers to force nails into the heel and the heel seat of the shoe to attach the heel to the shoe, means for transmitting a reactive force of the nail drivers to the jack to force the heel seat of the shoe with secondary pressure against the heel, said third-named means being responsive to driving movement of the drivers for moving the jack and accordingly the pallet, the shoe and the heel attached to the shoe in a direction opposite to said second direction, and said second-named means being responsive to movement of the jack in a direction opposite to said second direction for moving the jack, the pallet and the shoe back to the transfer station.

61. In a heel attaching machine for use with a conveyor which has a loading and unloading station and is adapted successively to deliver shoes to said station, said heel attaching machine comprising a nailing die which has passages and is adapted to be engaged by a heel at a heel attaching station, nail drivers movable in said passages, a jack adapted successively to receive shoes at the loading and unloading station, means for positioning a heel upon the nailing die, means for moving the jack in one direction from the loading and unloading station to the heel attaching station, means responsive to movement of the jack in said one direction to the heel attaching station for moving the jack at the heel attaching station in a second direction to force a heel seat of the shoe carried by the jack against the positioned heel, means for operating the nail drivers to force nails into the heel and the heel seat of the shoe to attach the heel to the shoe, means for transmitting a reactive force of the nail drivers to the jack to force with secondary pressure the heel seat of the shoe against the heel, said third-named means being responsive to driving movement of the drivers for moving the shoe and its attached heel in a direction opposite to said second direction, and said second-named means being responsive to movement of the shoe and its attached heel in a direction opposite to said second direction for moving the jack and the shoe in a direction opposite to said one direction back to its loading and unloading station.

62. In a machine for attaching two parts of a shoe together, a fixed nailing die adapted to be engaged by one of said shoe parts at a heel attaching station, means for positioning said one shoe part adjacent to the die, a jack for supporting the other shoe part, a guide beam upon which the jack is slidingly mounted, power means for moving the jack on the guide beam between the heel attaching station and a loading and unloading station spaced from the heel attaching station, fastening-inserting means movable in said fixed die, fluid pressure means comprising one actuator which is operatively connected to the jack, a first cylinder forming with the actuator primary and secondary chambers, a second actuator which is operatively connected to the fastening-inserting means, a second cylinder forming with the second actuator a third chamber, a pressure line, a control valve connected to the pressure line, a branch line between the valve and said primary chamber, means responsive to one setting of said valve for rendering fluid in the pressure line available for the branch line and accordingly for the primary chamber thereby causing displacement of said one actuator and accordingly movement of the jack at the heel attaching station toward the nailing die to cause the shoe parts to be clamped together with primary pressure, a transfer line adapted at all times to connect said second and third chambers, and a sequence valve responsive to build-up pressure in the branch line and adapted to open at a predetermined pressure the transfer line to the branch line whereby to render said fastening-inserting means active to drive fastenings into the clamped shoe parts and substantially simultaneously therewith to apply augmented pressure against said one actuator thereby applying at the heel attaching station against the jack in addition to said primary pressure an augmented pressure which varies in accordance with force exerted against said second actuator in the driving of fastenings into the shoe parts.

References Cited in the file of this patent
UNITED STATES PATENTS

| 343,339 | Raymond | June 8, 1886 |
| 480,415 | Raymond | Aug. 9, 1892 |
| 2,746,046 | Lee | May 22, 1956 |

FOREIGN PATENTS

| 177,254 | Great Britain | Mar. 22, 1922 |